US012577872B2

(12) United States Patent
Penno et al.

(10) Patent No.: US 12,577,872 B2
(45) Date of Patent: Mar. 17, 2026

(54) ORIENTING ENERGY TRANSFER MECHANISM CONNECTIONS HIGH SIDE IN A WELL

(71) Applicant: Halliburton Energy Services, Inc., Houston, TX (US)

(72) Inventors: Andrew Penno, Pau (FR); David Joe Steele, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/604,605

(22) Filed: Mar. 14, 2024

(65) Prior Publication Data

US 2024/0309708 A1 Sep. 19, 2024

Related U.S. Application Data

(60) Provisional application No. 63/490,281, filed on Mar. 15, 2023, provisional application No. 63/490,294, filed on Mar. 15, 2023.

(51) Int. Cl.
| | |
|---|---|
| *E21B 47/135* | (2012.01) |
| *E21B 17/02* | (2006.01) |
| *E21B 23/06* | (2006.01) |
| *E21B 33/10* | (2006.01) |
| *E21B 41/00* | (2006.01) |
| *E21B 47/022* | (2012.01) |
| *E21B 47/26* | (2012.01) |
| *E21B 49/00* | (2006.01) |
| *G01V 20/00* | (2024.01) |

(52) U.S. Cl.
CPC .......... *E21B 47/135* (2020.05); *E21B 17/028* (2013.01); *E21B 23/06* (2013.01); *E21B 33/10* (2013.01); *E21B 41/0035* (2013.01); *E21B 47/022* (2013.01); *E21B 47/26* (2020.05); *E21B 49/00* (2013.01); *G01V 20/00* (2024.01)

(58) Field of Classification Search
CPC ...... E21B 47/135; E21B 17/028; E21B 23/06; E21B 33/10; E21B 41/0035; E21B 47/022; E21B 47/26; E21B 49/00; E21B 2200/20; E21B 2200/22; E21B 43/00; E21B 47/12; G01V 20/00
See application file for complete search history.

(56) References Cited

U.S. PATENT DOCUMENTS

| | | |
|---|---|---|
| 5,058,683 A | 10/1991 | Godfrey et al. |
| 5,096,001 A | 3/1992 | Buytaert et al. |
| (Continued) | | |

FOREIGN PATENT DOCUMENTS

| | | |
|---|---|---|
| WO | 2012109397 A2 | 8/2012 |
| WO | 2015044208 A2 | 4/2015 |
| (Continued) | | |

*Primary Examiner* — Brad Harcourt
(74) *Attorney, Agent, or Firm* — Scott Richardson; Parker Justiss, P.C.

(57) ABSTRACT

Provided is a well system and a method. The well system, in one aspect, includes a wellbore extending through one or more subterranean formations, and a tubular located within the wellbore. The well system, according to one aspect, further includes an energy transfer mechanism coupled to the tubular, wherein the energy transfer mechanism is located above 3 o'clock or above 9 o'clock relative to gravity.

20 Claims, 46 Drawing Sheets

(56) References Cited

U.S. PATENT DOCUMENTS

| | | | |
|---|---|---|---|
| 5,107,927 A | 4/1992 | Whiteley et al. | |
| 7,165,892 B2 | 1/2007 | Grigsby et al. | |
| 7,222,676 B2 | 5/2007 | Patel et al. | |
| 7,252,437 B2 | 8/2007 | Ringgenberg | |
| 7,900,698 B2 | 3/2011 | Stoesz | |
| 8,056,619 B2 | 11/2011 | Patel et al. | |
| 8,280,709 B2 | 10/2012 | Koutsabeloulis et al. | |
| 8,436,743 B2 | 5/2013 | Auzerais et al. | |
| 8,584,519 B2 | 11/2013 | Maida et al. | |
| 8,794,337 B2 | 8/2014 | Thomas et al. | |
| 8,839,850 B2 | 9/2014 | Algeroy et al. | |
| 8,919,439 B2 | 12/2014 | Grigsby et al. | |
| 8,985,215 B2 | 3/2015 | Tips et al. | |
| 9,038,739 B2 | 5/2015 | Manwill et al. | |
| 9,435,166 B2 | 9/2016 | Macdonald et al. | |
| 9,500,071 B2 * | 11/2016 | Morgan-Smith | E21B 47/12 |
| 9,624,763 B2 | 4/2017 | Samuelson et al. | |
| 9,683,412 B2 | 6/2017 | Richards | |
| 9,726,004 B2 | 8/2017 | Echols, III et al. | |
| 9,759,016 B2 | 9/2017 | Perez et al. | |
| 9,915,104 B2 | 3/2018 | Richards | |
| 9,988,894 B1 * | 6/2018 | Malone | E21B 43/128 |
| 10,060,196 B2 * | 8/2018 | Richards | E21B 47/135 |
| 10,145,224 B1 | 12/2018 | Shenoy et al. | |
| 10,533,381 B2 * | 1/2020 | Head | E21B 17/028 |
| 10,612,369 B2 | 4/2020 | Dufour et al. | |
| 10,621,500 B2 | 4/2020 | Dusterhoft et al. | |
| 10,934,785 B2 * | 3/2021 | Fripp | H01R 3/08 |
| 10,989,033 B2 | 4/2021 | Martysevich et al. | |
| 11,187,071 B2 | 11/2021 | Luo et al. | |
| 11,295,048 B2 | 4/2022 | Borrel et al. | |
| 11,560,771 B2 | 1/2023 | Hern | |
| 11,753,875 B2 | 9/2023 | Hanson et al. | |
| 12,129,714 B2 | 10/2024 | Cassidy et al. | |
| 12,134,959 B2 | 11/2024 | Poizat | |
| 2003/0141075 A1 | 7/2003 | Bixenman et al. | |
| 2007/0257812 A1 | 11/2007 | Lasater et al. | |
| 2008/0128130 A1 | 6/2008 | Whitsitt et al. | |
| 2009/0045146 A1 | 2/2009 | Stoesz | |
| 2009/0063069 A1 | 3/2009 | Wu | |
| 2009/0078421 A1 | 3/2009 | Guignard et al. | |
| 2009/0078429 A1 | 3/2009 | Du et al. | |
| 2011/0192596 A1 | 8/2011 | Patel | |
| 2011/0214883 A1 | 9/2011 | Patel | |
| 2012/0043079 A1 | 2/2012 | Wassouf et al. | |
| 2012/0045917 A1 | 2/2012 | Head | |
| 2016/0090833 A1 | 3/2016 | Samuelson et al. | |
| 2016/0138373 A1 | 5/2016 | Wood et al. | |
| 2016/0251931 A1 | 9/2016 | Buchan et al. | |
| 2016/0356095 A1 | 12/2016 | Perez et al. | |
| 2017/0005448 A1 | 1/2017 | Williams et al. | |
| 2017/0081926 A1 | 3/2017 | Pike | |
| 2018/0030810 A1 | 2/2018 | Saldanha | |
| 2019/0153854 A1 | 5/2019 | Manin | |
| 2019/0292902 A1 | 9/2019 | Jarvis et al. | |
| 2020/0018149 A1 | 1/2020 | Luo et al. | |
| 2020/0309982 A1 | 10/2020 | Jin et al. | |
| 2020/0386073 A1 | 12/2020 | Joubran et al. | |
| 2020/0386096 A1 | 12/2020 | Sugiura et al. | |
| 2021/0131254 A1 | 5/2021 | Potty et al. | |
| 2021/0140276 A1 | 5/2021 | Steele, Jr. | |
| 2021/0222520 A1 | 7/2021 | Steele et al. | |
| 2021/0222548 A1 | 7/2021 | Steele et al. | |
| 2021/0372276 A1 | 12/2021 | Steele et al. | |
| 2022/0025753 A1 | 1/2022 | Heidari et al. | |
| 2022/0292338 A1 | 9/2022 | Nair et al. | |
| 2022/0341293 A1 | 10/2022 | Steele | |
| 2023/0071743 A1 | 3/2023 | Li et al. | |
| 2024/0125183 A1 | 4/2024 | Mahendran et al. | |
| 2024/0151111 A1 | 5/2024 | Cassidy et al. | |
| 2024/0309731 A1 | 9/2024 | Steele et al. | |
| 2024/0318510 A1 | 9/2024 | Steele | |
| 2024/0318511 A1 | 9/2024 | Steele | |
| 2024/0318529 A1 | 9/2024 | Alkadem et al. | |
| 2024/0318539 A1 | 9/2024 | Steele | |

FOREIGN PATENT DOCUMENTS

| | | |
|---|---|---|
| WO | 2018175508 A1 | 9/2018 |
| WO | 2022109157 A1 | 5/2022 |
| WO | 2022192669 A1 | 9/2022 |

* cited by examiner

| Material (condition) | Angle of Repose (degrees) |
|---|---|
| Chalk | 45° |
| Clay(dry lump) | 25 - 40° |
| Clay(wet excavated) | 15° |
| Earth | 30 - 45° |
| Granite | 35 - 40° |
| Gravel(crushed stone) | 45° |
| Gravel(natural w/ sand) | 25 - 30° |
| Sand(dry) | 34° |
| Sand(water filled) | 15 - 30° |
| Sand(wet) | 45° |

FIG. 1B

Clevis

Fluid chamber

Annular gap between piston and cylinder

Orifices drilled through the piston

Clevis Extension

High strength seal

Piston

Cylindrical housing

Double ended rod

Communication/Power Line
to Surface

One or more communication
devices,methods,etc.
one of more energy transfer
devices,methods,etc.

Drillpipe

Running/
Setting Tool

MC S (Open)

Packer

Barrier Valve (Open)

Casing shoe

ORIENTING ENERGY TRANSFER MECHANISM CONNECTIONS HIGH SIDE IN A WELL

CROSS-REFERENCE TO RELATED APPLICATION

This application claims the benefit of U.S. Provisional Application Ser. No. 63/490,294, filed on Mar. 15, 2023, entitled "ORIENTING WET MATE CONNECTIONS HIGH SIDE IN A WELL," and U.S. Provisional Application Ser. No. 63/490,281, filed on Mar. 15, 2023, entitled "COMPLETION-AND-PRODUCTION MONITORING AND CONTROL VIA A SINGLEDOWNHOLE WET-MATE (E.G., FIBER OPTIC WET-MATE), METHODS, SYSTEMS, AND DEVICES FOR RECORDING DOWN-HOLE COMPLETION-ACTIVITY (E.G., FRAC-PACK-ING) WITH THE ABILITY TO SWITCH TO LONG-TERMPRODUCTION DATA GATHERING AND TRANSMISSION TO SURFACE," which are commonly assigned with this application and incorporated herein by reference in their entirety.

BACKGROUND

A variety of borehole operations require selective access to specific areas of the wellbore. One such selective borehole operation is horizontal multistage hydraulic stimulation, as well as multistage hydraulic fracturing ("frac" or "frack-ing"). In multilateral wells, the multistage stimulation treatments are performed inside multiple lateral wellbores. Effi-cient access to all lateral wellbores is critical to complete a successful pressure stimulation treatment, as well as is critical to selectively enter the multiple lateral wellbores with other downhole devices.

BRIEF DESCRIPTION

Reference is now made to the following descriptions taken in conjunction with the accompanying drawings, in which:

FIGS. 1A through 23 illustrate various different embodi-ments of the disclosure, many of which are related to the positioning of a wet mate high side;

FIG. 28A' illustrates an alternative embodiment to that shown in FIG. 28A;

DETAILED DESCRIPTION

Figure 1A:
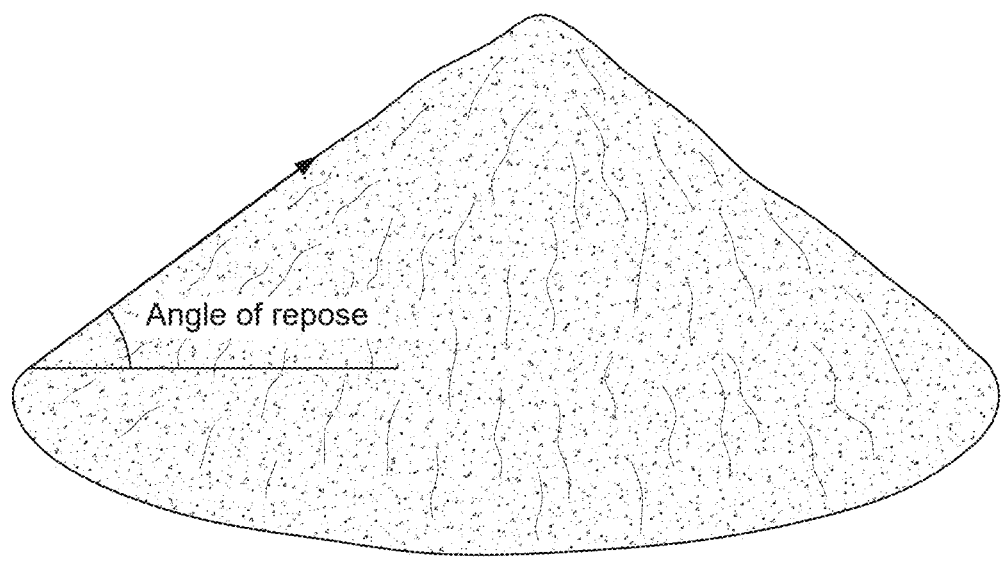

In the drawings and descriptions that follow, like parts are typically marked throughout the specification and drawings with the same reference numerals, respectively. The drawn figures are not necessarily to scale. Certain features of the disclosure may be shown exaggerated in scale or in some-what schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describ-ing an interaction between elements is not meant to limit the interaction to direct interaction between the elements and may also include an indirect interaction between the ele-ments described.

Unless otherwise specified, use of the terms "up," "upper," "upward," "uphole," "upstream," or other like terms shall be construed as generally away from the bottom, terminal end of a well, regardless of the wellbore orienta-tion; likewise, use of the terms "down," "lower," "down-ward," "downhole," "downstream," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean forma-tion" shall be construed as encompassing both areas below exposed earth and areas below earth covered by water such as ocean or fresh water.

To broaden the scope of this disclosure, the following phrases will be used:

Energy Transfer Mechanism (ETM)—a device for trans-ferring energy. In some embodiments, the device may comprise a Coupling, a Wet Mate Coupling, an Induc-tive Coupling, a Capacitance Coupling, a Fluidic Cou-pling, an Electrical Coupling, a Mechanical Coupling, a wireless coupling, a combination of more than one type of coupling—of those listed above and/or others not listed, other couplings, other devices, etc. In some embodiments, an ETM may comprise a transformer where one type of energy is converted to another type of energy (e.g., an electrical solenoid where electricity is converted into a mechanical energy).

First Equipment Section—in one or more embodiments, the first equipment section comprises a Lower Comple-tion String (which may include a Sand Control String, a Liner, Screens, a Flow Control Device, a Packer, an Anchor, Shoe, a Sensor, a control line (electrical, hydraulic, fiber optic, a combination of one or more, including a tubing encapsulated conductor (TEC) or metal tubing (e.g., bare stainless steel), etc.), one or more ETMs to engage/connect/communicate with another mating one or more ETMs associated with the second equipment section and/or third equipment section and/or other tools or devices, an orientation device to orient a third equipment section (or parts thereof), or other tools or devices, one or more Dry Mates, one or more Wet Mates, a Tool Face or other feature to signify the high side (12 o'clock position) of the first equipment section or of the one or more components of the first equipment section, one or more communication devices to transmit, receive, or both (e.g. transceiver) one or more signals from/to below and/or to/from above the communication device. etc.

Figure 3:
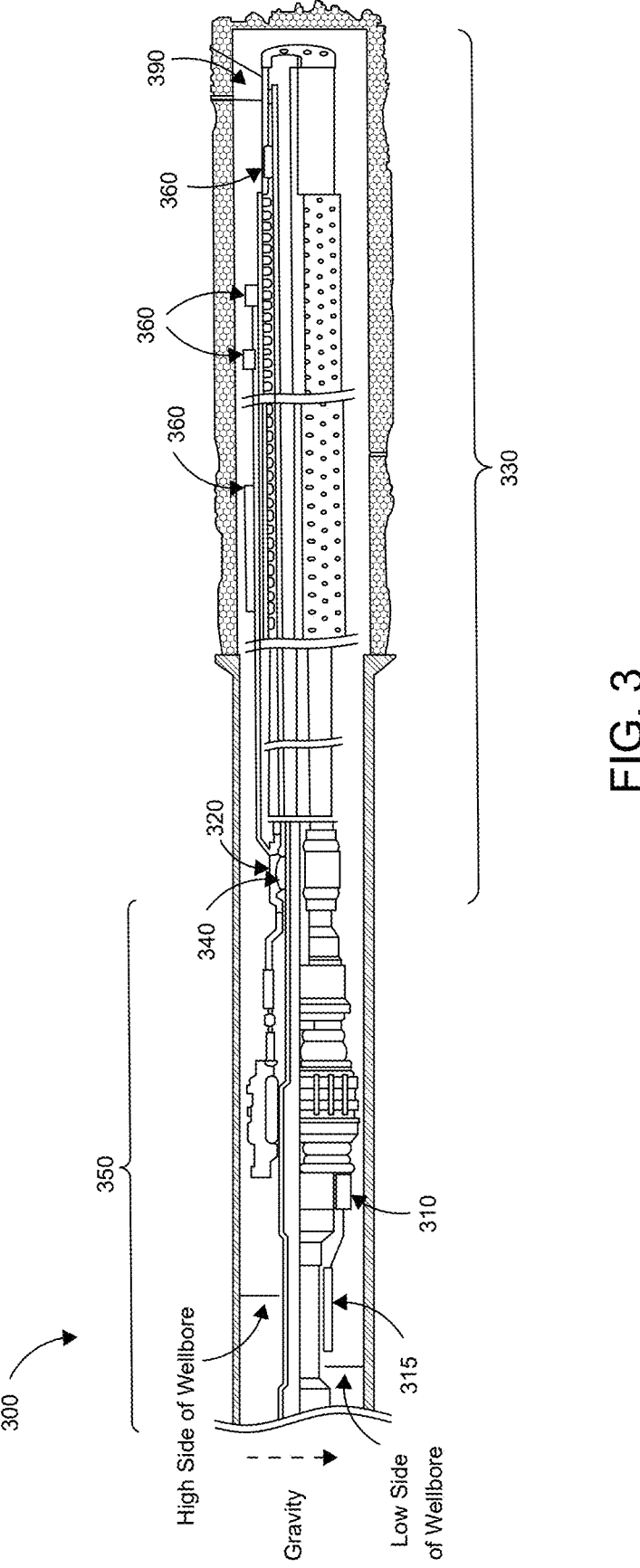
Figure 5:
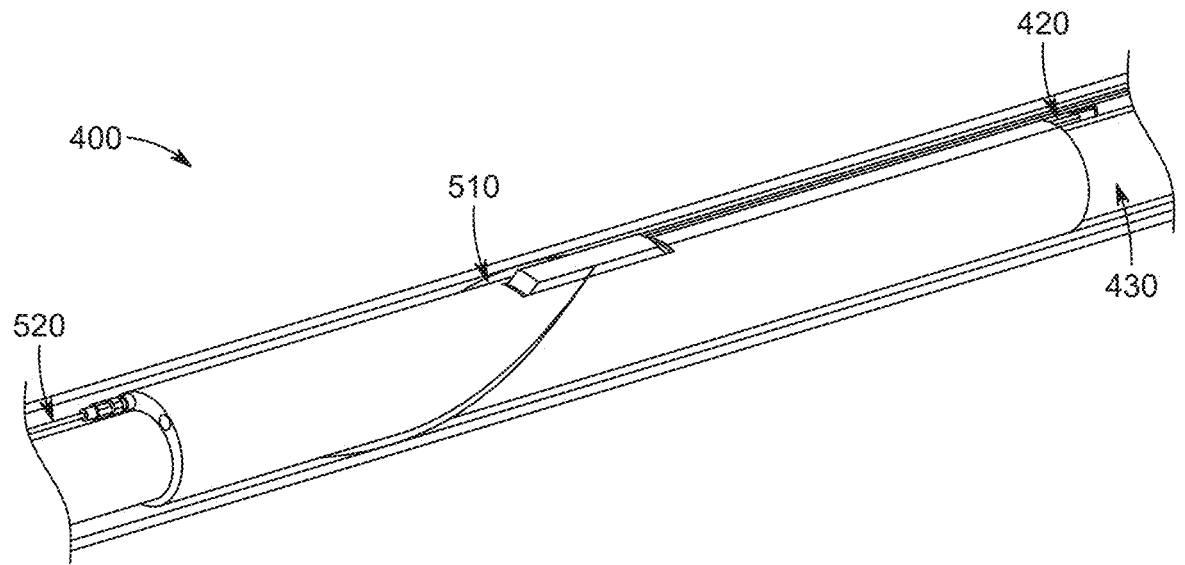

Second Equipment Section—in some embodiments, the second equipment section comprises a Work String (aka Service String, Frac String, Setting String, Stimulation String, etc.). In some embodiments, the second equipment section is used to convey the first equipment section into a wellbore. The second equipment section may have other uses such as, for example, pumping fluid(s) down to the first equipment section for stimulation purposes (and/or other purposes). In this Disclosure, the second equipment section may also comprise an orientation device and/or a communication device:

Orientation Device—the orientation device, shown in FIG. 3 and FIG. 5, will determine the orientation of the device with respect to gravity. The orientation device may comprise a "tool face"-a face, mark, reference point which the angle may be calculated/measured relative to the orientation of the wet mate connection of the first equipment section. By knowing the orientation (angle) of the "tool face" with respect to gravity, the second equipment section (e.g., Work String) can be rotated so a known feature (e.g., wet mate connection of the first equipment section) can be position high side (e.g., less than ±45 degrees, less than ±30 degrees, less than ±20 degrees, less than ±10 degrees, less than ±5 degrees, less than ±1 degree) in the wellbore. In at least one embodiment, it is desired that the wet mate connection of the first equipment section be oriented high side. Furthermore, at the surface, before running the tools, it is desired to know the orientation of the second equipment section Orientation Device's tool face relative to the orientation of the first equipment section's wet mate connection. Accordingly, when on bottom, the Work String may be rotated to orient the wet mate connection of the first equipment section to be high side.

Communication Device—the communication device, also shown in FIG. 3 and FIG. 5, will transfer the data to/from the First and/or second equipment section (e.g., Lower Completion String and/or Work String) to the surface. In some embodiments (e.g., when used with the Work String), orientation data (orientation of the "tool face" and/or the first ETM (aka First (Lower) Fiber Optic Coupler/Wet Mate) is used to ensure the first ETM is aligned to the high side of the wellbore to ensure debris will move away from the first ETM via gravity.

Wet Mate—a connection that is capable, but not necessary, of being made up in a wet environment and still maintain a good reliable and sealed connection. A wet mate connection can also be made in a dry environment (e.g., uphole).

Dry Mate—a connection that should be made up in a dry environment (e.g., whether uphole or downhole) and still maintain a good reliable and sealed connection.

Third Equipment Section—in some embodiments, a third equipment section comprises a Completion String (aka Production String, Upper Completion String, Middle Completion String, etc.). In some embodiments, the third equipment section is used to provide a conduit for fluids from the first equipment section to a locale uphole or above the first equipment section (e.g., surface, subsea tree, etc.). The third equipment section may have other uses such as, for example, conveying tools down to the first equipment section, or other sections, for various reasons such as production evaluation, clean out operations, and/or other purposes. In this Disclosure, the third equipment section may also comprise an orientation device and/or a communication device such as those described within or other types of orientation devices and/or communication devices. As one example, the third equipment section may comprise an orientation sensor and/or device to monitor the orientation of the third equipment section (or one or more of its components) while it is being deployed into a well. The third equipment section may comprise one or more ETMs to engage/connect/communicate with another mating one or more ETMs associated with the second equipment section and/or third equipment section and/or other tools or devices, an orientation device to orient a third equipment section (or parts thereof), or other tools or devices, one or more Dry Mates, one or more Wet Mates, a Tool Face or other feature to signify the high side (12 o'clock position) of the third equipment section (or of the one or more components of the First or third equipment sections), one or more communication devices to transmit, receive, or both (e.g. transceiver) one or more signals from/to below and/or to/from above the communication device.

The present disclosure acknowledges that there are certain instances, particularly during production, completion, stimulation and/or fracturing operations, where it may be desirable to employ an energy transfer mechanism (e.g., wet mate connection) in a downhole (e.g., wet environment). The present disclosure, based upon this acknowledgment, has recognized that debris, such as frac sand in one embodiment, may substantially prevent the energy transfer mechanism (e.g., wet mate connection) from achieving a good reliable and sealed connection. With this in mind, the present disclosure has in one embodiment designed an apparatus with the placement of the ETM (e.g., wet mate connection) on a high side of the tubular (e.g., such that ETM is located above 3 o'clock or above 9 o'clock relative to gravity (e.g., gravity being located at 6 o'clock), above 2 o'clock or above 10 o'clock relative to gravity (e.g., gravity being located at 6 o'clock), above 1 o'clock or above 11 o'clock relative to gravity (e.g., gravity being located at 6 o'clock), etc.), which greatly reduces this problem. In one embodiment, the ETM has a first coupling surface configured to couple with an opposing second coupling surface of a second ETM, and further wherein the first coupling surface is located above 3 o'clock or above 9 o'clock relative to gravity (e.g., gravity being located at 6 o'clock), above 2 o'clock or above 10 o'clock relative to gravity (e.g., gravity being located at 6 o'clock), above 1 o'clock or above 11 o'clock relative to gravity (e.g., gravity being located at 6 o'clock), etc. In at least one other embodiment, all portions of the ETM are located above 3 o'clock or above 9 o'clock relative to gravity (e.g., gravity being located at 6 o'clock), above 2 o'clock or above 10 o'clock relative to gravity (e.g., gravity being located at 6 o'clock), above 1 o'clock or above 11 o'clock relative to gravity (e.g., gravity being located at 6 o'clock), etc. The inverse may also hold true, wherein no portion of the ETM is located below 3 o'clock or below 9 o'clock relative to gravity (e.g., gravity being located at 6 o'clock), below 2 o'clock or below 10 o'clock relative to gravity (e.g., gravity being located at 6 o'clock), below 1 o'clock or below 11 o'clock relative to gravity (e.g., gravity being located at 6 o'clock), etc.

In accordance with at least one embodiment, an orientation tool as discussed in detail below could be coupled to a slotted orientation apparatus, the orientation tool configured to orient the energy transfer mechanism (e.g., wet mate connection) and the slot of the slotted orientation apparatus within the wellbore (e.g., on the high side of the tubular). In yet another embodiment the orientation tool is a measurement while drilling (MWD) tool that uses pressure pulses to orient the energy transfer mechanism (e.g., wet mate connection) and slot of the slotted orientation apparatus within the wellbore.

One or more projects intend to implement an energy transfer mechanism (e.g., a downhole fiber optic wet mate connection) to monitor downhole sensors. The coupling of energy transfer mechanisms (e.g., wet mate connections) in a downhole environment is a risky process. The process can be made worse if the energy transfer mechanisms (e.g., wet mate connections) are oriented on the low side of the wellbore, where debris, sediments, proppant, etc. may settle and impede the coupling of the wet mate connection. The solution is to orient the energy transfer mechanisms (e.g., wet mate connections) to the high side of the wellbore (e.g., depending on the design such that no portion of the energy transfer mechanism (e.g., wet mate connection) is located below 3 o'clock or below 9 o'clock relative to gravity, below 2 o'clock or below 10 o'clock relative to gravity, below 1 o'clock or below 11 o'clock relative to gravity, etc.) so that debris, sediments, proppant, etc. will settle on the low side of the wellbore away from the Couplers. This will prevent debris from interfering with the coupling and de-coupling of the energy transfer mechanism (e.g., wet mate connection).

One tool that determines the orientation of the tool and communicates the orientation information to the surface is Halliburton's Workstring Orientation Tool (WOT). The WOT incorporates Mud Pulse Telemetry technology to relay the "tool face" information to the surface. This information allows the drillers to rotate the Work String until the proper "tool face" orientation is achieved. In most embodiments, the "tool face" of the WOT (or similar orientation device) is measured relative to the orientation of the first ETM (aka First (Lower) Fiber Optic Coupler/Wet Mate) that is affixed to the first equipment section (Lower Completion String). This allows the Driller (and others) on the rig floor to know the orientation of the first ETM so it can be oriented high side. High side is typically defined as 180-degrees From low side—the direction of the earth's gravitational vector. High side can be defined by an orientation range such as +/−90-degrees From high side, +/−60-degrees From high side, +/−45-degrees From high side, +/−30-degrees From high side, +/−20-degrees From high side, +/−15-degrees From high side, +/−10-degrees From high side, whether symmetrical or non-symmetrical, etc.

In some embodiments, the high side (or high side range) can be related to the angle of repose as shown in FIG. 1A. The angle of repose angle is the angle where a material on the slope face is on the verge of sliding. By keeping the orientation of the first ETM greater than the angle of repose of the debris in the well, one can be confident the debris will slide off the sides (features) of the ETM coupling, or even slide out of features of other devices associated with the well (e.g., components previously installed and/or to be installed later) and/or associated with well operations (e.g., stimulation tools, clean out tools, etc.) in certain embodiments, thus not interfering with the coupling/de-coupling/engagement/alignment of the ETM(s).

Turning to FIG. 1B, illustrated are the angle or repose of some materials that may be classified as debris in a well.

Figure 2:
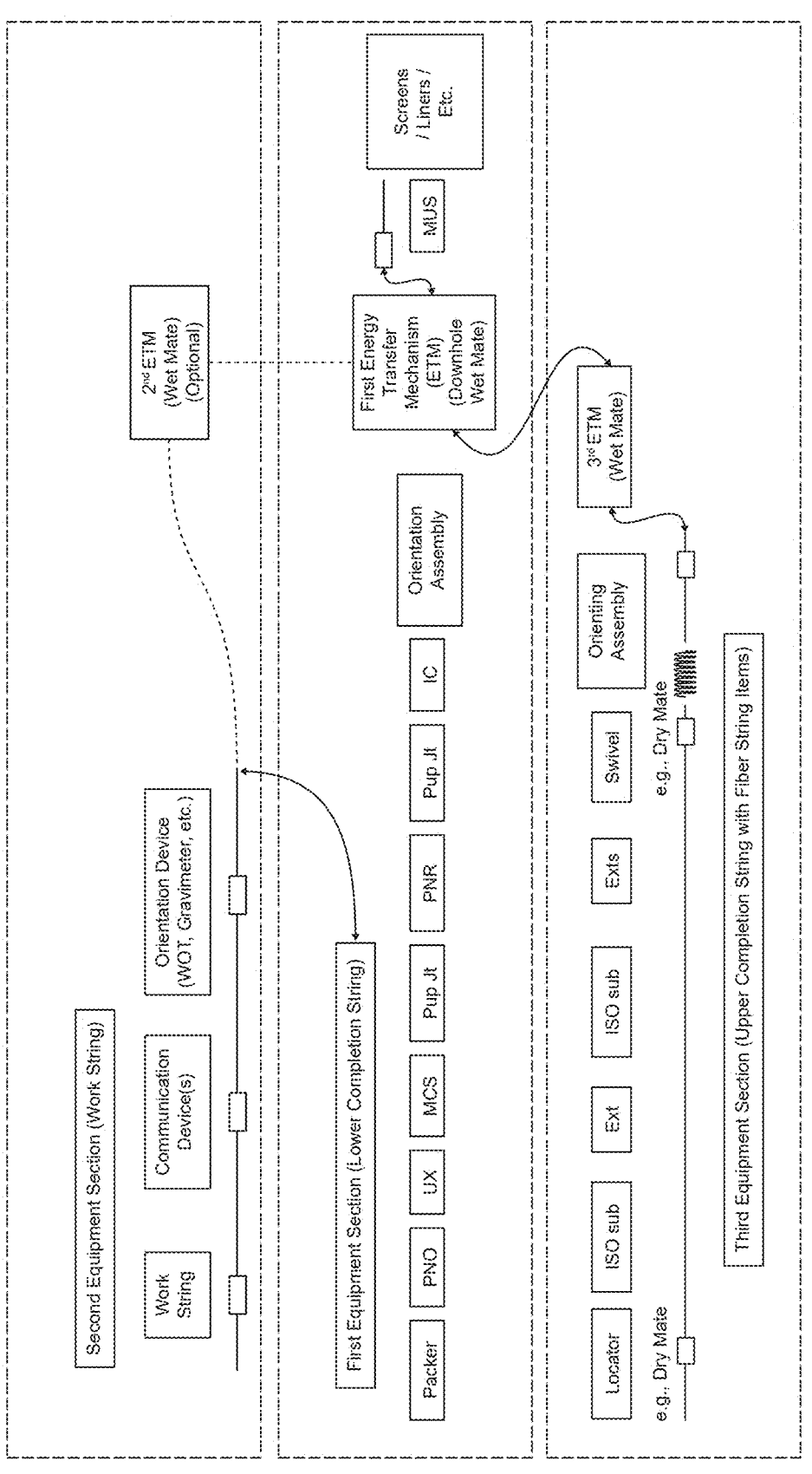

Turning to FIG. 2, illustrated is one embodiment of the disclosure. In at least one embodiment, provided is an apparatus that is usable with a well, and includes a first equipment section that includes an oriented first ETM and a second equipment section. The second equipment section may be adapted to be run downhole into the well releasably attached to the first equipment section. A mechanism (Orientation Device) of the apparatus indicates when the oriented first ETM is substantially oriented opposite to the Earth's gravitational field by at least 90, 60, 45, 30, 20, 15, 10 degrees. In at least one other embodiment, the apparatus comprises a mechanism to relay information from the apparatus to the surface (or other remote location) (reference Communication Devices(s) in FIG. 2. The information comprises at least the orientation of the oriented first ETM or similarly oriented mechanism/component (e.g., WOT's gravimeter or another similar device).

In at least one other embodiment, the apparatus comprises a second ETM, for example coupled to the first ETM. In this embodiment, the second ETM could be coupled with the first ETM when the first and second sections are coupled together, and for example being run-in-hole. Thus, the first ETM and the second ETM could be substantially oriented opposite to the Earth's gravitational field by at least 90, 60, 45, 30, 20, 15, 10 degrees, as discussed above.

In at least one other embodiment, the apparatus may a first equipment section that includes an oriented first ETM and a third equipment section that includes a third ETM. The third equipment section may be adapted to be run downhole into the well after the first equipment section is positioned and oriented downhole, and in one embodiment after the second equipment section and the second ETM has disconnected from the first ETM. A mechanism of the apparatus may urge the third ETM into the same orientation as the oriented first ETM. The oriented first ETM may be substantially oriented opposite to the Earth's gravitational field, as discussed above.

In at least one embodiment, the apparatus includes a mechanism to encourage the rotational alignment of the third ETM with the oriented first ETM. For example, the apparatus may include a mechanism to encourage the axial alignment of the third ETM with the oriented first ETM, or include a mechanism to encourage the releasably locking of the third ETM with the oriented first ETM. In at least one other embodiment, the apparatus may include a mechanism to encourage the gradual engagement (shock/spring device) of the third ETM with the oriented first ETM, or may include a mechanism to exclude debris, wipe mating components before engagement, inject a fluid for cleansing mating components prior to engagement, sliding sleeves (or similar components) to protect one or more surfaces/seals/components. In at least one other embodiment, the apparatus may run fiber to electric submersible pump (ESP) applications.

The ability to detect one or more parameters related to a tool (e.g., orientation of a feature of the tool, temperature, etc.) and/or the operation (pumping fluid, etc.) being performed, then to relay information such as the orientation of a tool to a remote location (e.g., surface) and then adjust a feature of the tool (e.g., orientation) under harsh conditions (dirty environment (solids, contaminated fluids such as drilling muds, or completion fluid), extreme pressures (e.g., >20,000-psi differential), extreme temperatures (e.g., <−20

F to >300 F), makes this disclosure suitable for use in harsh environments such as outer space (e.g., satellites, spacecrafts, etc.), aeronautics (aircrafts), on-ground (swamps, marshes, etc.), below ground (mines, caves, etc.), ocean (on surface and subsea), subterranean (mineral extraction, storage wells (Carbon sequestration, Carbon capture and storage (CCS), etc.), and other energy recovery activities (geothermal, steam, etc.).

Certain commercial competitive advantages of the present disclosure include: 1) reliably connect Fiber Optic Couplers (and/or other Wet Mates) without the risk of debris, sediment, proppant, etc. interfering with the process; 2) providing customers with an assurance of a risk-free gravel-pack completion system; 3) outperforming the competition; 4) application to various deep water projects (e.g., Guyana projects); 5) applications in the Carbon Capture, Utilization and Storage (CCUS) markets.

One proposed solution is an apparatus 300, for example using an orientation device 310 to orient a first ETM 320 to the high side of the wellbore 390, as shown in FIG. 3. The first ETM 320, as illustrated in FIG. 3, may be installed on the first equipment section 330 (e.g., Lower Completion, Sand Control String, etc.) and oriented to the high side of the wellbore 390, as shown. This provides the advantage that debris will fall away from the first ETM 320 during subsequent operations (e.g., frack-packing, gravel packing, production, etc.). Likewise, the debris will not interfere with the coupling/de-coupling of the first ETM 320, for example the decoupling of the first ETM with a second ETM, or the subsequent coupling of the first ETM 320 with a third ETM.

In some embodiments, a second ETM 340 that forms a portion of a second equipment section 350 may be coupled to the first ETM 320 while the first equipment section 330 (e.g., Lower Completion, Sand Control String, etc.) is being lowered into the well (see FIG. 3) and while performing other operations (such as frack packing) downhole. As shown in FIG. 3, the orientation of the first ETM 320 is known relative to the orientation of the orientation device 310 (e.g., WOT's Tool Face) prior to running the equipment in the well. The orientation device 360 may transmit its orientation (and/or the orientation of the first ETM 320) to the surface via one or more communication devices. The transmission may occur continuously while running the equipment in the well, intermittently, or only when the equipment is near the bottom of the well or at the desired setting depth.

In at least one embodiment, the orientation device 310 may be two or more devices, for example; 1) a sensor device to sense the orientation; and 2) a communication device 315 to transmit information (e.g., to/from the orientation sensor(s) and/or other sensors/devices). The communication device 315 may comprise one or more components and/or devices to communicate information to/from the surface or other locale.

If it is desirable to monitor the orientation continuously while running the equipment in the wellbore 390, wired pipe or other technology of continuously sending signals to the surface may be employed. If the orientation needs to be known less frequently, other communication devices/protocols may be considered. For example, mud pulse telemetry, acoustic signals, a combination of both may be employed. One or more other methods/systems may be used to transfer "energy" signals from the orientation device 310, the communication device 315, the first ETM 320, the second ETM 340 and/or other devices. It is noted that other signals (power signals, communication signals, sensor readings, data, etc.) may also be transmitted via one or more oriented ETMs 320, 340, etc. Furthermore, one or more sensors 360 may be associated with and/or coupled with the first equipment section, such that the first ETM 320 may be used to assist in transmitting information obtained with the one or more sensors 360 uphole.

Figure 4:
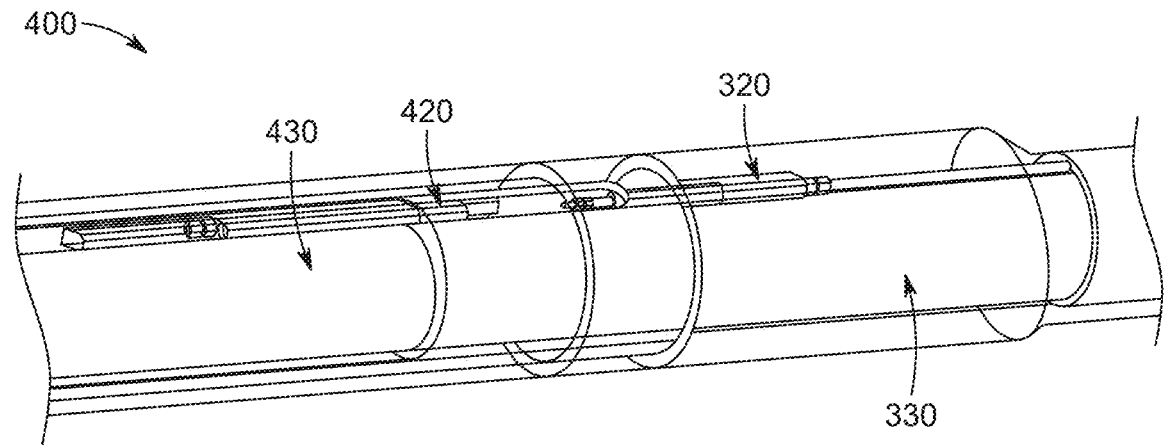

In other embodiments, a third ETM 420 may be coupled to the first ETM 320, as shown in FIG. 4. In some of these embodiments, the third ETM 420 may be run with a third equipment section 430, as shown in FIG. 4. The third ETM 420 may engage with the first ETM 320 before/during/after the third equipment section 430 engages with the first equipment section 330.

Figure 6:
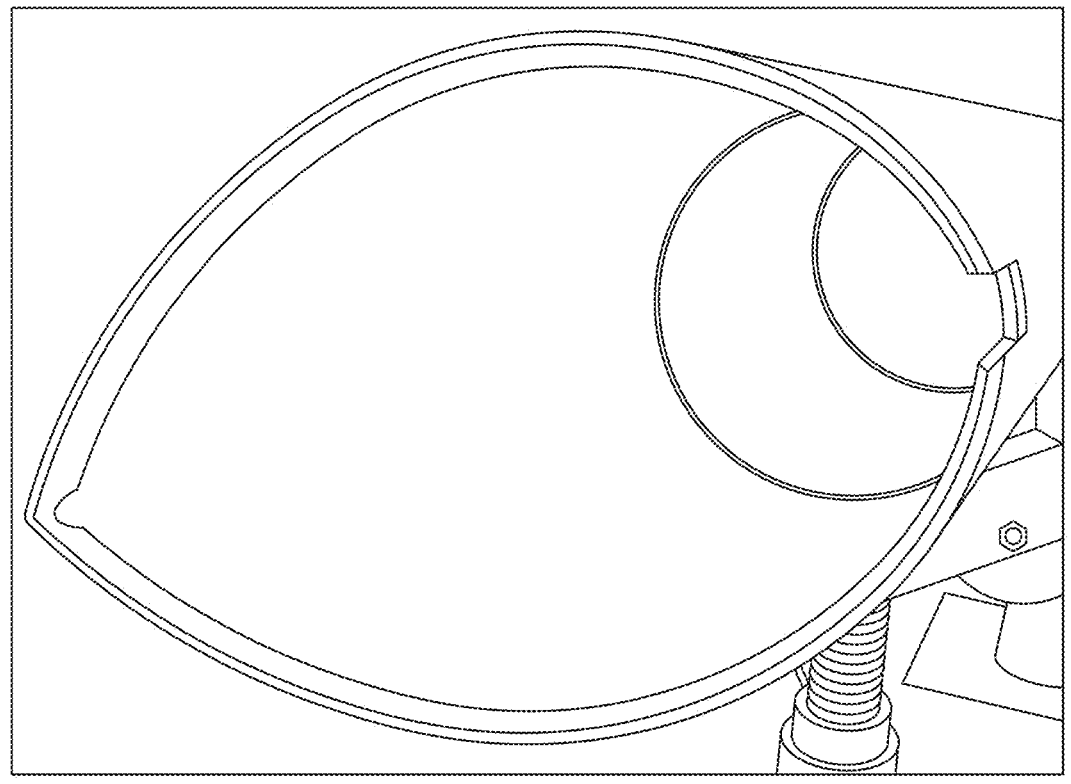
Figure 7:
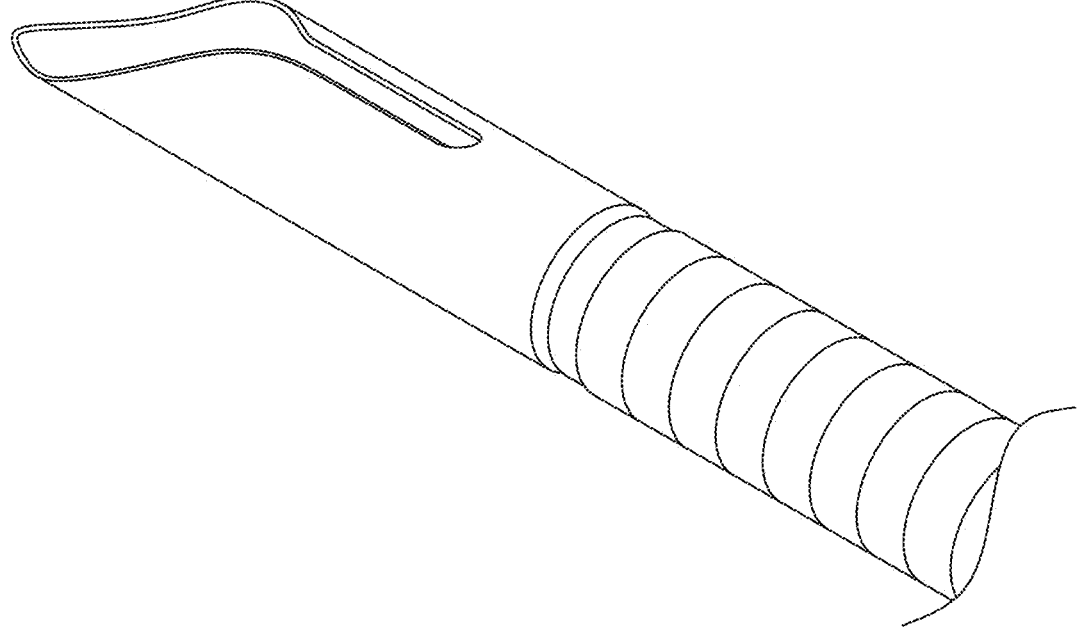
Figure 8:
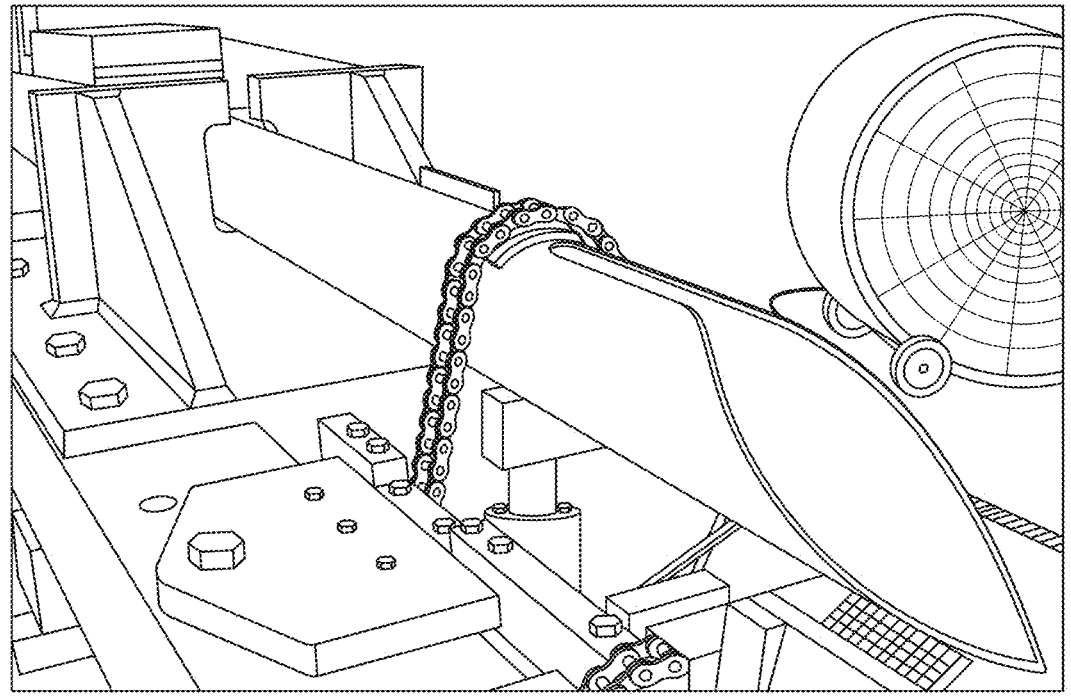
Figure 9:
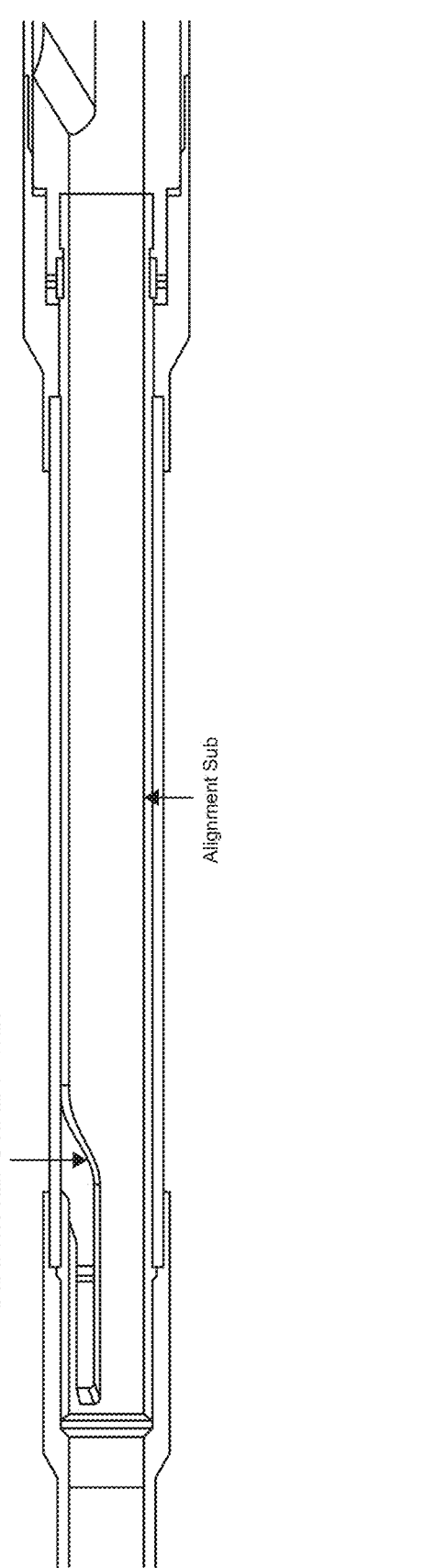

In certain embodiments, the first ETM 320 is held in a high side orientation due to the weight of the first equipment section 330, anchors, packers, materials placed between the exterior surface of the first equipment section 330 and the wellbore (or partial sections thereof) (e.g., proppant, cement, frack-pack), etc. In some embodiments, the first equipment section 330 has one or more devices 510 to urge the third ETM 420 into a same orientation as the first ETM 320, as shown in FIG. 5. In the illustrated embodiment of FIG. 5, the third equipment section 430 includes the third ETM 420, the one or more device 510, as well as a communications device 520 (e.g., control line, whether a fiber optic line, an electric line, a hydraulic line, a combination thereof, etc.). Some such devices may be described as a scoop assembly (e.g., FIG. 6), a muleshoe assembly (FIGS. 7 and 8), and orientation slot assembly (FIG. 9), a bishop's hat, a helix, etc.

Figure 10:
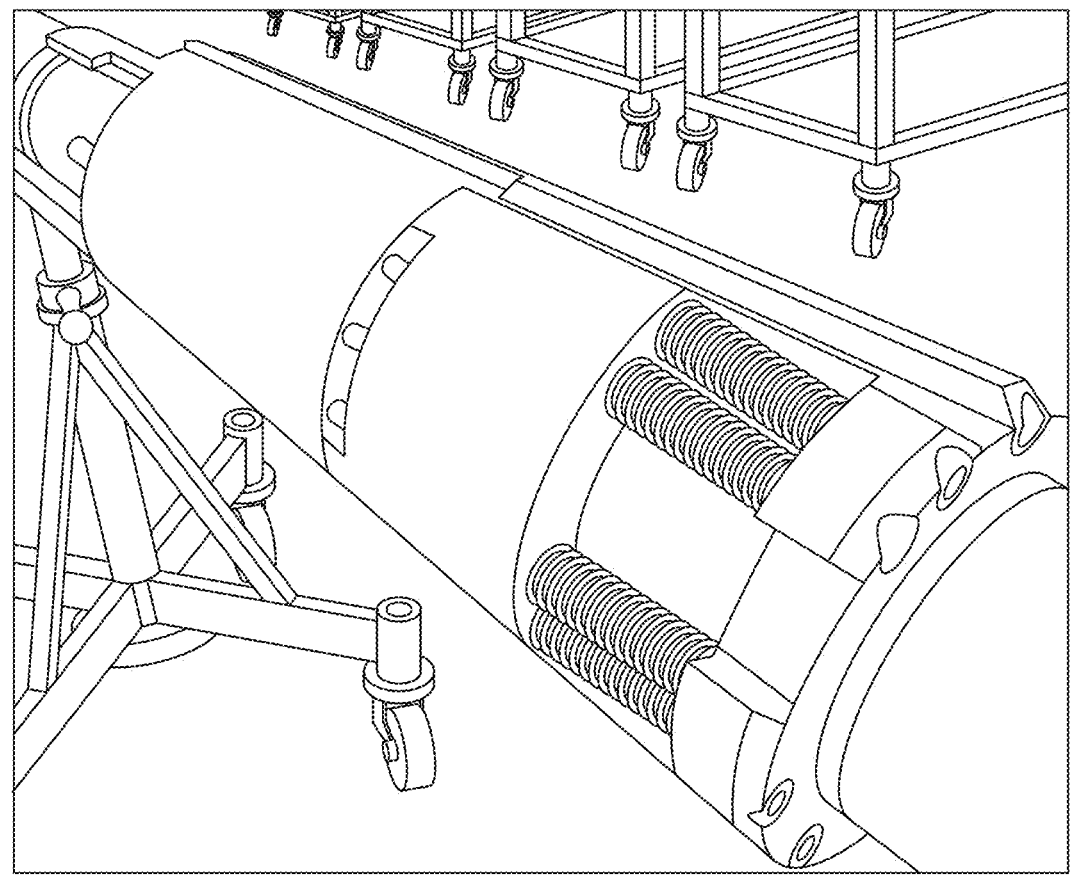
Figure 11:
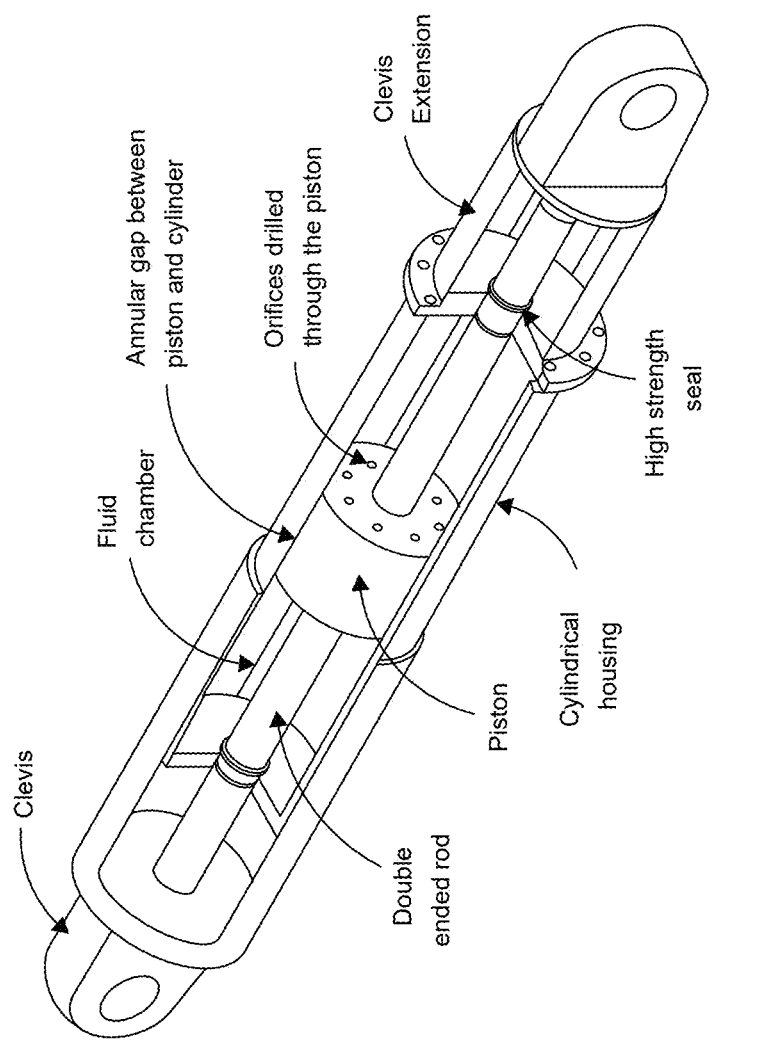

In some embodiments, the first equipment section may have one or more devices to releasably anchor, fixedly anchor, and/or position the second ETM or the third ETM to the first ETM. In some embodiments, the first equipment section, the second equipment section, and/or the third equipment section may comprise one or more devices. In some embodiments, the first equipment section may have one or more devices to cushion or dampen landing and/or engagement of the second ETM and/or the third ETM to the first ETM. Two such examples are shown in FIGS. 10 and 11. Likewise, the second equipment section and/or the third equipment section may have one or more devices to cushion or dampen or improve the engagement, coupling, uncoupling, etc. events.

In some alternate embodiments, a second ETM is installed on the second equipment section and a communication apparatus 315 is employed, as shown in FIG. 3. Accordingly, signals may be transmitted to the surface (and back from surface) while tripping in hole, while orienting, while setting packers, while gravel packing, during the stimulation process, etc. In FIG. 3, the second ETM 340 is coupled to the first ETM 320 while the first equipment section (e.g., lower completion, sand control string, etc.) is being run-in-hole, as well as while other operations (such as frack packing) are being conducted.

Figure 12:
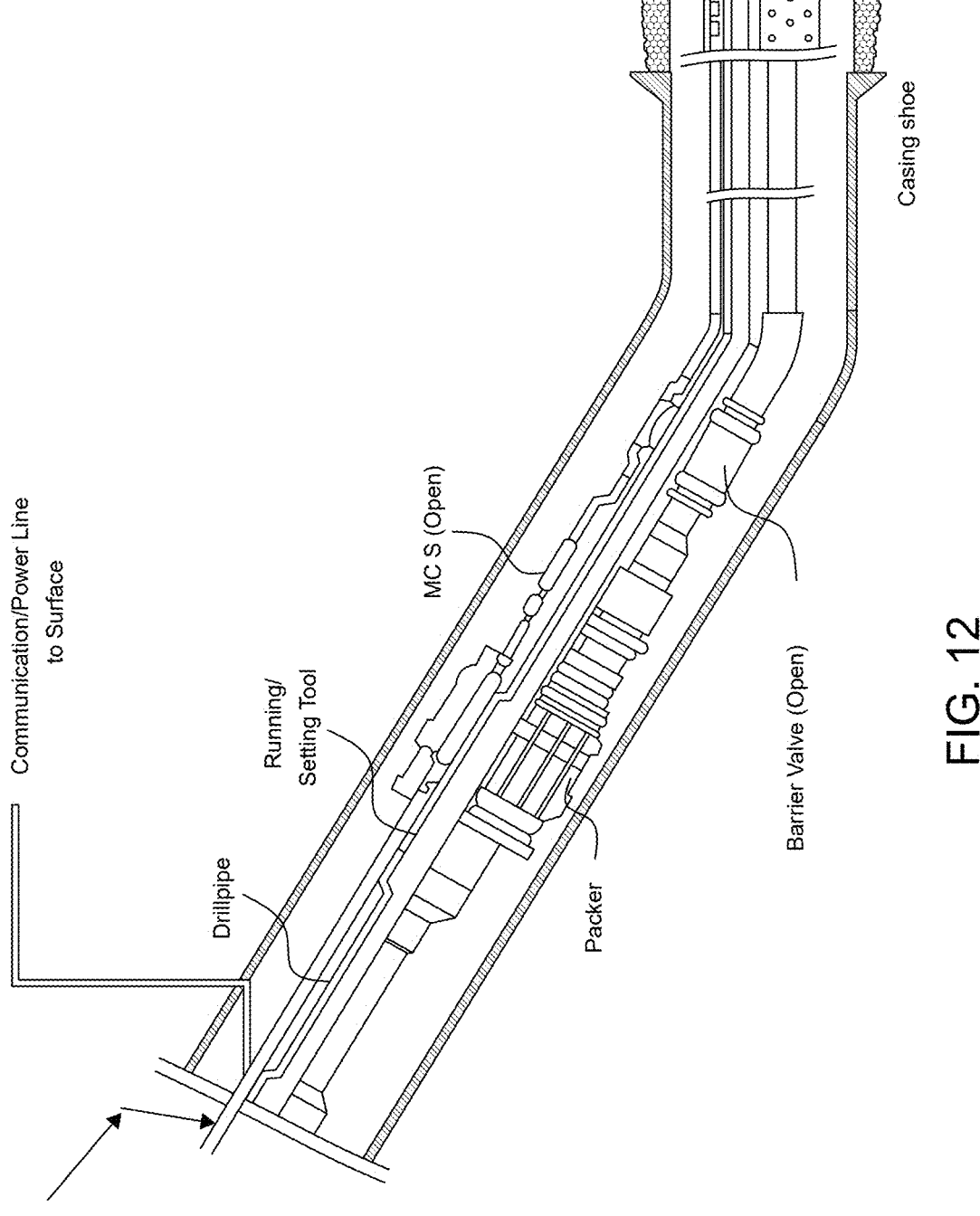

Turning to FIG. 12, illustrated is an embodiment wherein one or more communication devices, methods, etc. and/or ETM devices, methods, etc. for transferring energy (data, signals, power, and/or other things) to or from other locations (e.g., including, but not limited, to the surface, etc.) are shown. In some embodiments, the communication device may be a fiber optic line, a fiber optic line protected in a control line, a fiber optic line attached to a tubular string (drill pipe, tubing string, work string, etc.), etc. In some embodiments, the communication device may be an electrical line. In some embodiments, the communication device may be a combination of energy conduits. Other embodiments may include sound, optics, pressure pulses, other energies or combination thereof, etc. Accordingly, unless otherwise stated, the present disclosure should not be limited to any specific energies.

Figure 13:
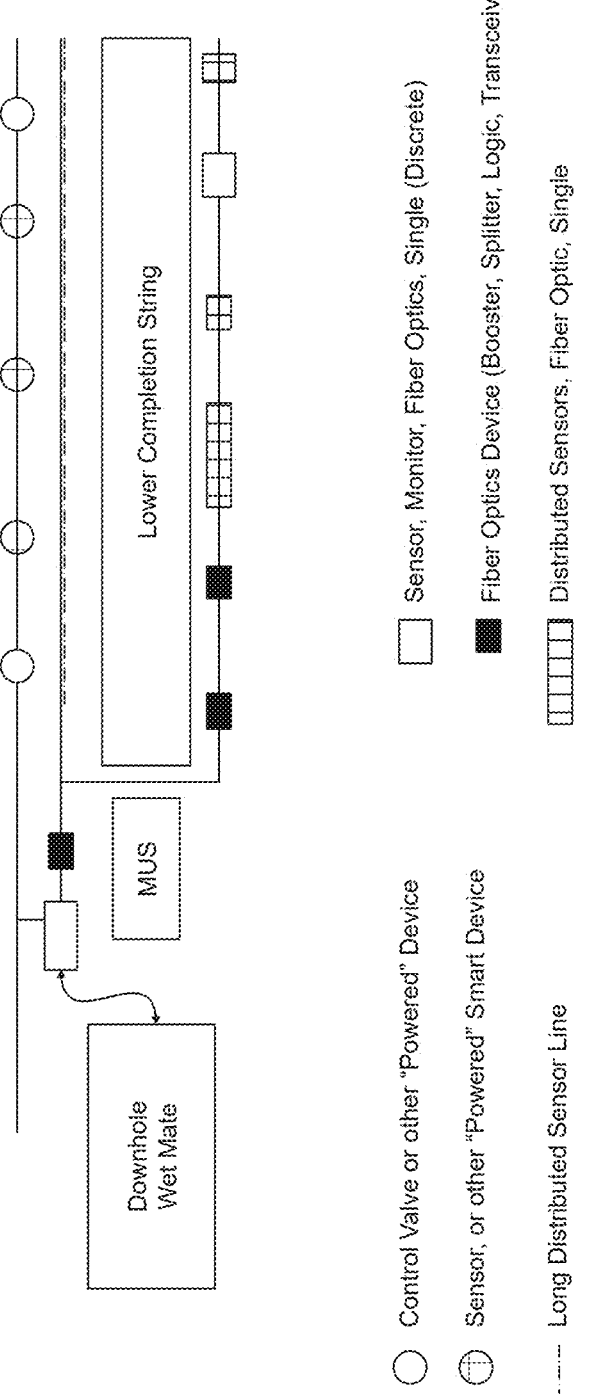
Figure 14:
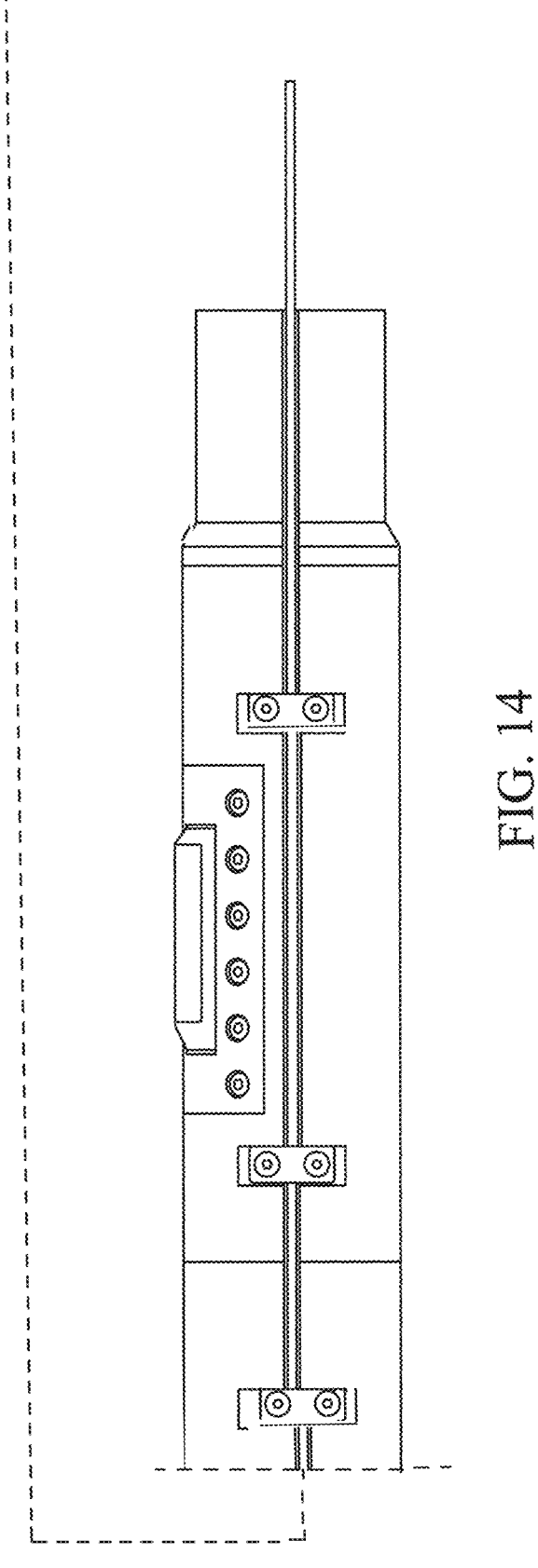
Figure 15:
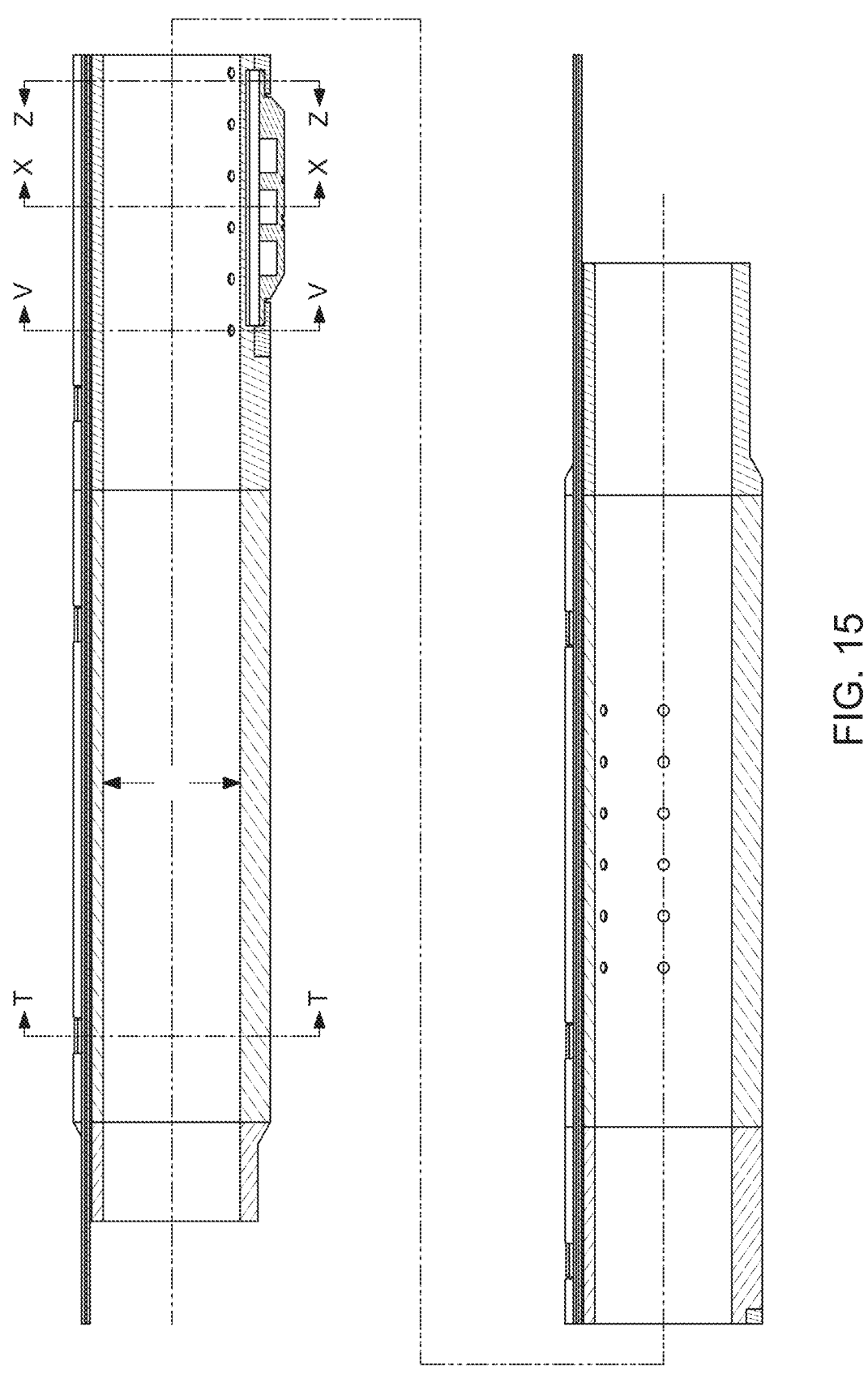
Figure 17:
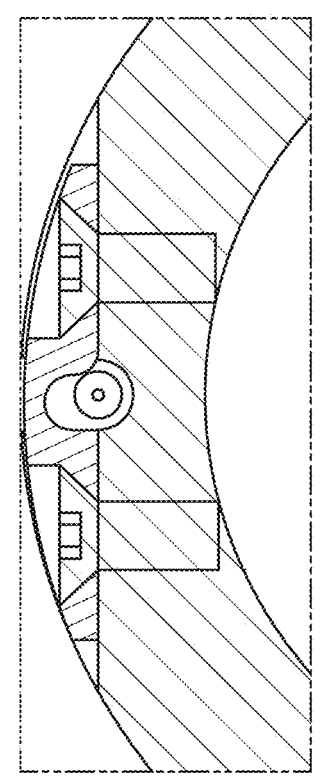
Figure 16:
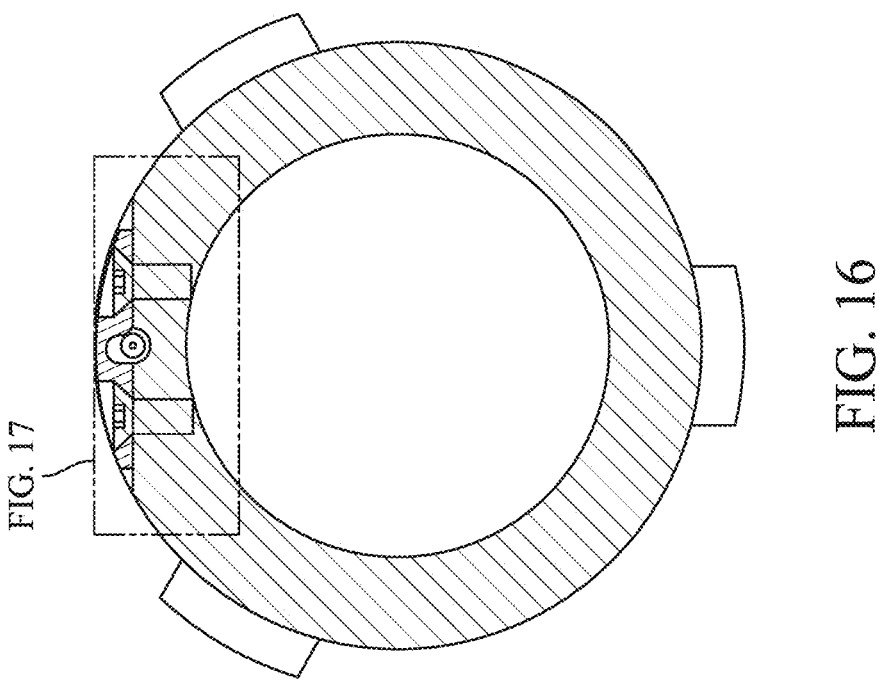
Figure 19:
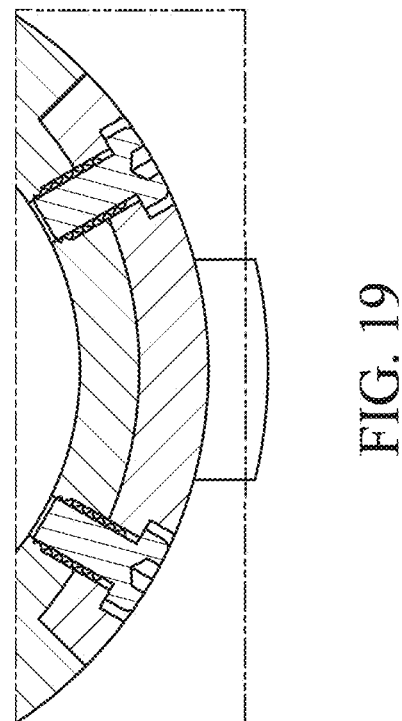
Figure 18:
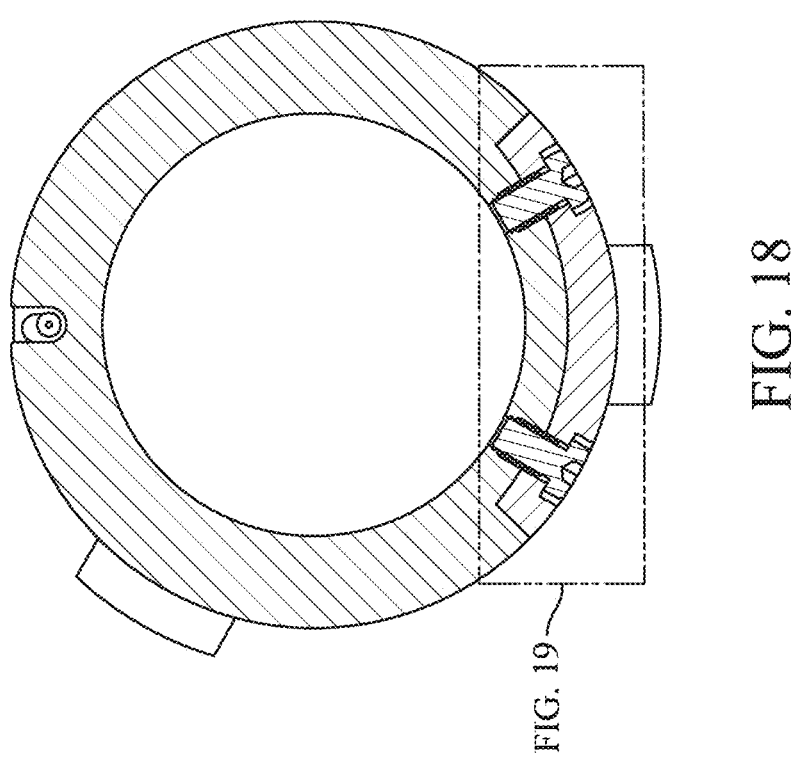
Figure 21:
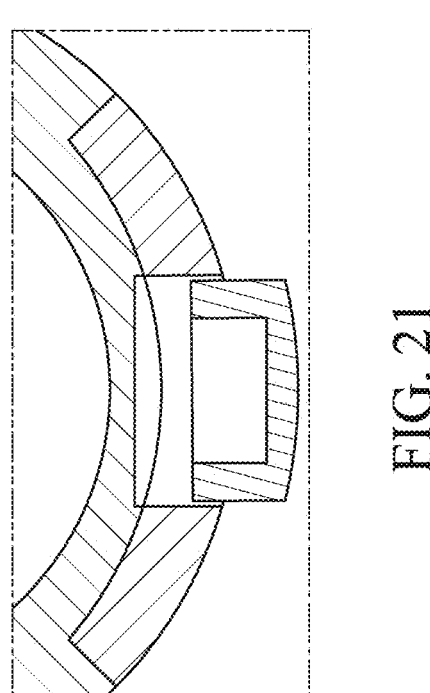
Figure 20:
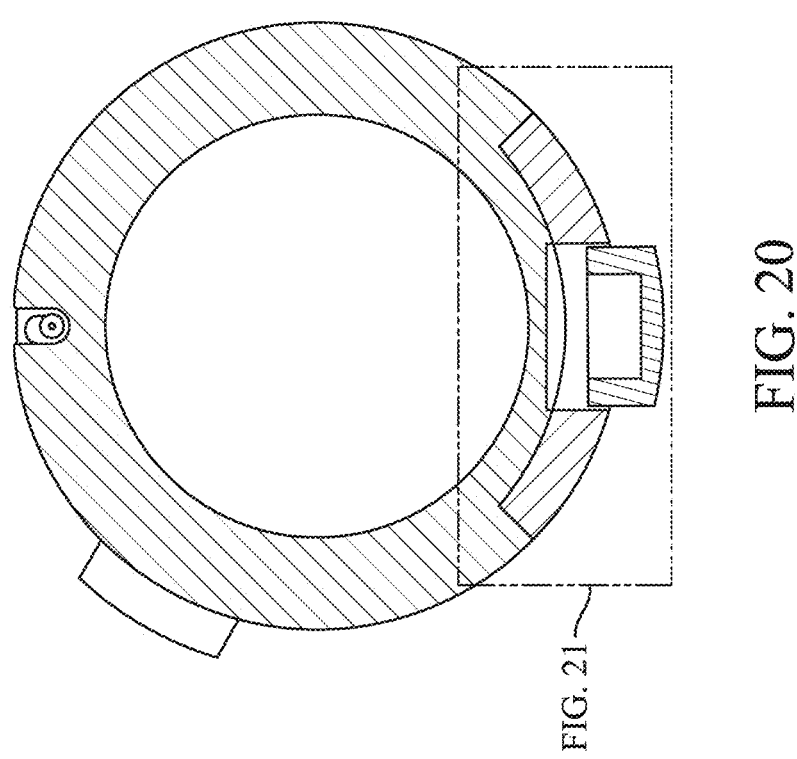
Figure 23:
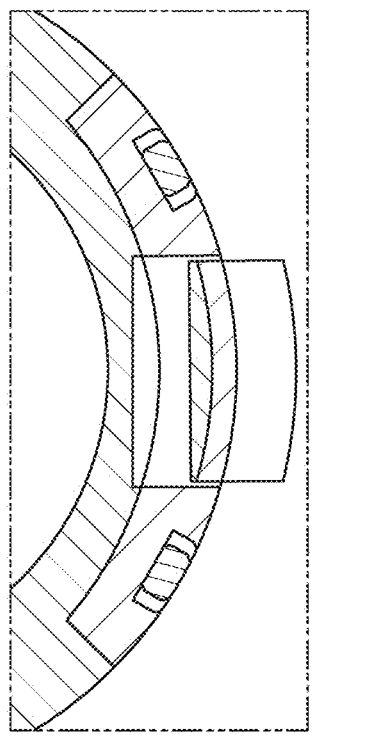
Figure 22:
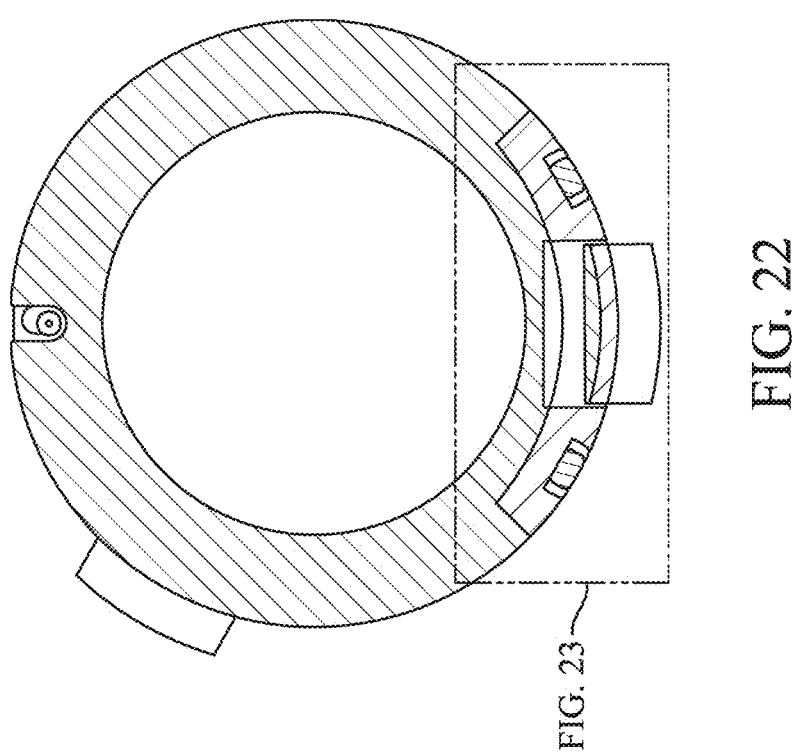

In some alternate embodiments, the first equipment section (e.g., lower completion string) (e.g., examples are shown in FIGS. 3 and 13) may include sand screens, frac pack screens, expandable screens, oriented screens, a base pipe, inflow control valves (e.g., ICVs), inflow control devices (e.g., ICDs), autonomous inflow control devices (e.g., AICDs), electric inflow control devices (eICDs), casing, liner, perforated pipe, etc.). As shown in FIG. 13, the first ETM may be a downhole wet mate that is connected to a control line that includes (e.g., consisting of one or more of the energy transfer lines) a fiber optic cable, an electric line, a hydraulic line and/or another type of energy transfer line.

In some alternate embodiments, the First Energy Transfer Mechanism may be comprised of more than one type of Energy Transfer Mechanism. As an example, the First Energy Transfer Mechanism may comprise a Fiber Optic Wet Mate and an Electrical Wet Mate. The Wet Mates may be aligned serially, parallel or any other configuration that allows both to be connected to other Wet Mates.

In some alternate embodiments, the first equipment section (e.g., lower completion string) and/or the second equipment section (e.g., work string) and/or third equipment section (e.g., upper completion string) may include one or more other apparatuses to enhance or improve the performance and/or reliability of the overall disclosure. For example, sensors, valves, pumps, analyzers, controllers, logic devices, computing devices, memory devices, AI devices, TinyML devices, etc. may be employed. Certain real time operations may occur and/or be performed. For example, in at least one embodiment, a second ETM (e.g., Fiber Optic or other Wet Mate) is installed on the second equipment section (e.g., Work String) and a communication apparatus (e.g., wired pipe, HalSonics, etc.) is employed, as shown in FIGS. 3 and 12. In at least one embodiment, such may be integrated into a digital reservoir management system (e.g., such as Halliburton's Clarity® digital reservoir management system), and thus interconnected to share data seamlessly and deliver real-time solutions from ideation through the reservoir management. The operators on surface would be able to monitor what is happening downhole in real time. Some of these embodiments may require fiber optic, electrical, and/or other types of conduits (cables) to pass the signals (and power) to/from the surface. Other means of communication to and from the surface may also be employed such as pressure pulses, acoustic waves, etc.

Turning to FIGS. 14 through 23, illustrated are various different views of a multilateral orientation tool that includes a novel control line design.

The present disclosure acknowledges that there are certain instances, particularly during stimulation and/or fracturing operations, where it may be desirable to employ a slotted orientation apparatus (e.g., also known in the art as a slotted muleshoe) to position a downhole tool within a wellbore. The present disclosure, based upon this acknowledgment, has recognized that debris, such as frac sand in one embodiment, may collect within the slot in the slotted orientation apparatus and present problems with a key of an associated keyed running tool sliding within the slot. With this in mind, the present disclosure has in one embodiment designed a slotted orientation apparatus with the placement of the slot on a high side of the tubular (e.g., such that no portion of the slot is located below 3 o'clock or below 9 o'clock relative to gravity), which greatly reduces this problem. In yet another embodiment, the slot may be replaced with a feature that would traditionally engage with the slot (e.g., a peg), and the slot would be on the second or third equipment section. For example, such an embodiment could employ a slot that radially extends around the tubular 180 degrees or less, and in one embodiment a slot that has its radial center point positioned at 12 o'clock relative to gravity. In accordance with at least one embodiment, an orientation tool could be coupled to the slotted orientation apparatus, the orientation tool configured to orient the slot of the slotted orientation apparatus within the wellbore (e.g., on the high side of the tubular). In yet another embodiment the orientation tool is a measurement while drilling (MWD) tool that uses pressure pulses to orient the slot of the slotted orientation apparatus within the wellbore.

The present disclosure has additionally acknowledged that it can, at times, be difficult to align the keys of the keyed running tool with the slot in the slotted orientation apparatus. The present disclosure has recognized that such can especially be the case when the slot in the slotted orientation apparatus does not extend entirely around the tubular, such as is the case with the aforementioned slotted orientation apparatus with the placement of the slot on the high side of the tubular. With this acknowledgment in mind, the present disclosure designed a keyed running tool having two or more keys movable between a radially retracted state and a radially extended state, wherein adjacent ones of the two or more keys are laterally offset from each other and radially offset from each other by Y degrees, wherein Y is 180 degrees or less. Given this design, ideally at least one of the two keys would engage with the slot when the keyed running tool is being deployed downhole.

Figure 24:
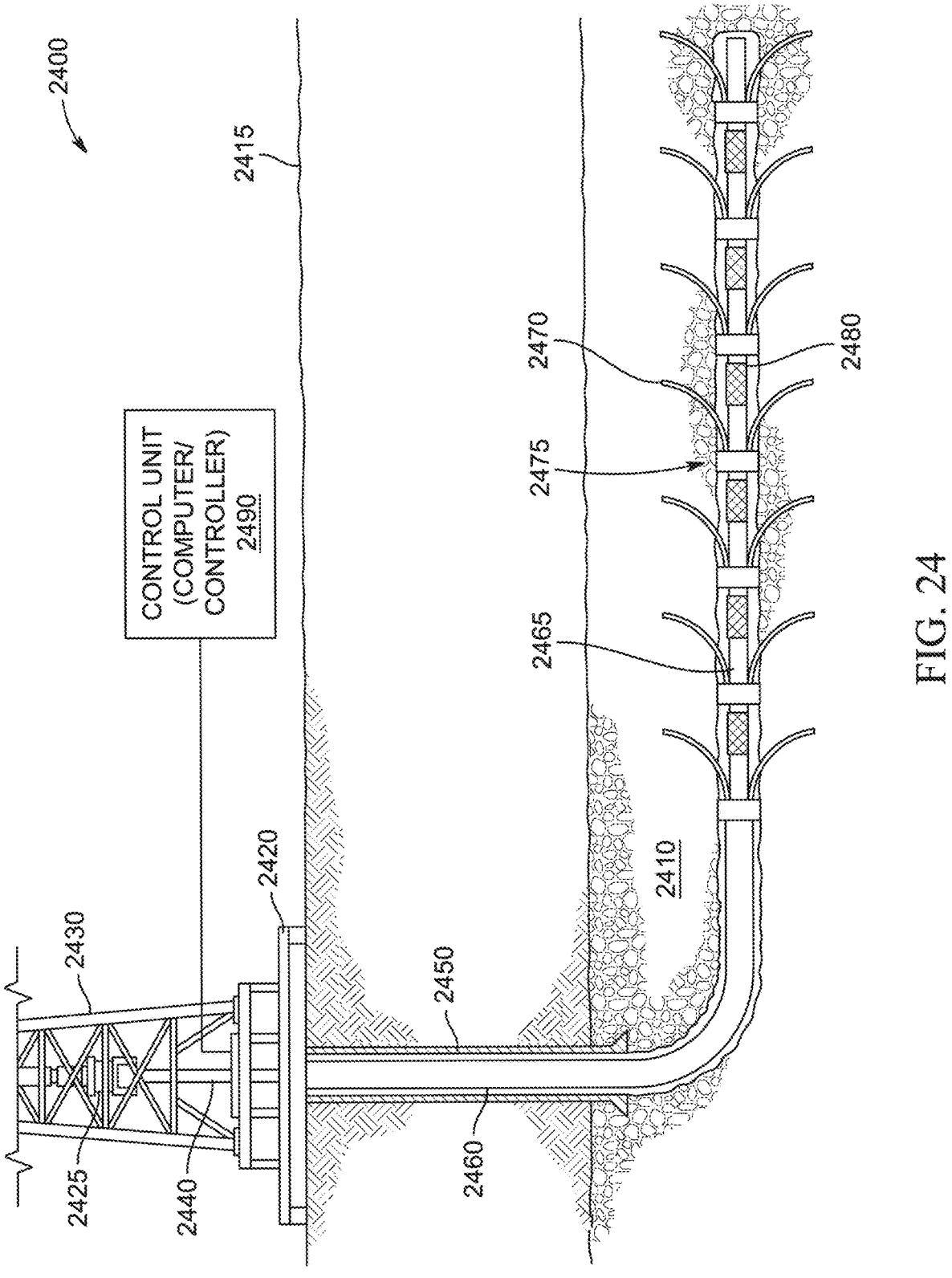
FIG. 24 illustrates a well system designed, manufactured, and operated according to one or more embodiments of the disclosure.

FIG. 24 illustrates a well system 2400 designed, manufactured, and operated according to one or more embodiments of the disclosure. The well system 2400 includes a platform 2420 positioned over a subterranean formation 2410 located below the earth's surface 2415. The platform 2420, in at least one embodiment, has a hoisting apparatus 2425 and a derrick 2430 for raising and lowering a downhole conveyance 2440, such as a drill string, casing string, tubing string, coiled tubing, a running tool, etc. Although a land-based oil and gas platform 2420 is illustrated in FIG. 24, the scope of this disclosure is not thereby limited, and thus could potentially apply to offshore applications. The teachings of this disclosure may also be applied to other land-based multilateral wells different from that illustrated.

The well system 2400, in one or more embodiments, further includes a main wellbore 2450. The main wellbore 2450, in the illustrated embodiment, includes tubing 2460, 2465, which may have differing tubular diameters. Extending from the main wellbore 2450, in one or more embodiments, may be one or more lateral wellbores 2470. Furthermore, a plurality of multilateral junctions 2475 may be positioned at junctions between the main wellbore 2450 and the lateral wellbores 2470. The multilateral junctions 2475 may be designed, manufactured and operated according to one or more embodiments of the disclosure. In accordance with at least one embodiment, the multilateral junction 2475 may include a slotted orientation apparatus and/or keyed running tool according to any of the embodiments, aspects, applications, variations, designs, etc. disclosed in the following paragraphs.

The well system 2400 may additionally include one or more ICVs 2480 positioned at various locations within the main wellbore 2450 and/or one or more of the lateral wellbores 2470. The well system 2400 may additionally include a control unit 2490. The control unit 2490, in this embodiment, is operable to provide control to, or receive signals from, one or more downhole devices.

Figure 25:
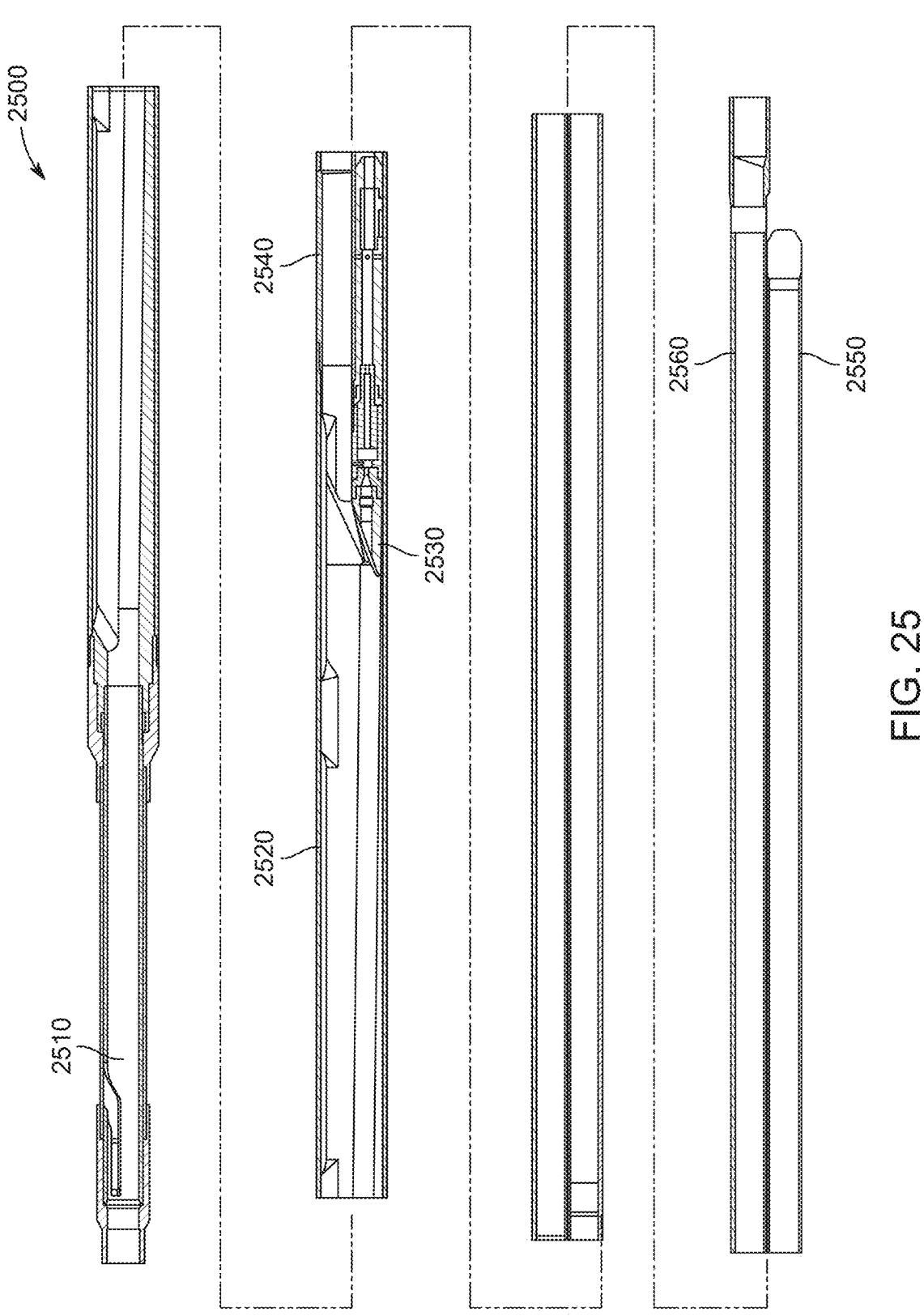
FIG. 25 illustrates one embodiment of a multilateral junction designed, manufactured and/or operated according to one or more embodiments of the disclosure.
Figure 25:
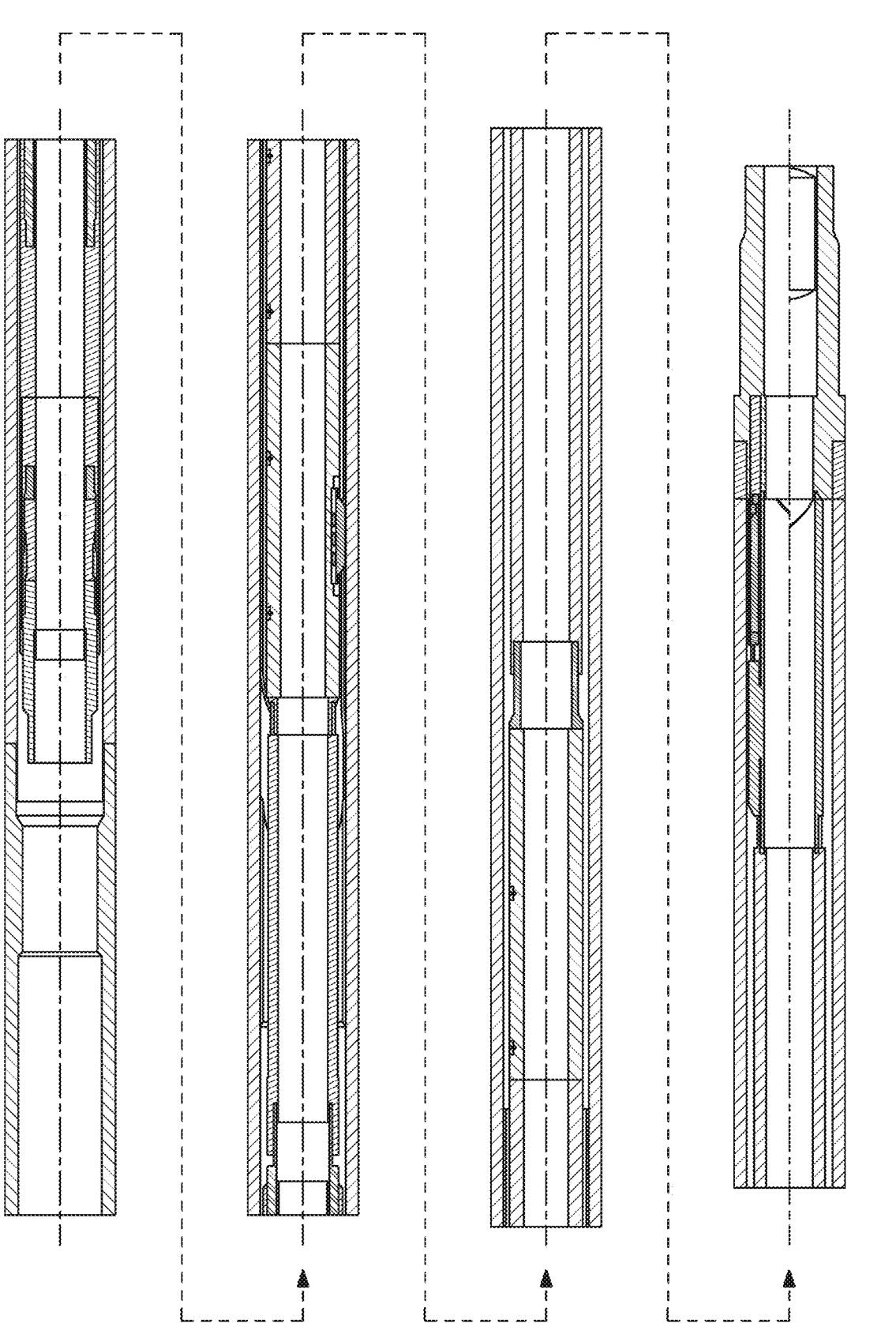

Turning to FIG. 25, illustrated is one embodiment of a multilateral junction 2500 designed, manufactured and/or operated according to one or more embodiments of the disclosure. The multilateral junction 2500, in the illustrated embodiment, includes a slotted orientation apparatus 2510. In at least one embodiment, the slotted orientation apparatus 2510 includes a tubular having a wall thickness (t). The slotted orientation apparatus 2510, in at least one other embodiment, additionally includes a slot extending at least partially through the tubular, the slot having first and second axial portions laterally offset from one another by a distance $(d_s)$, and an angled portion connecting the first and second axial portions, wherein the slot radially extends around the tubular X degrees, wherein X is 180 degrees or less. In one or more embodiments, the slot extends entirely through the wall thickness (t) of the slotted orientation apparatus 2510, but in other embodiments the slot only extends into an inner surface of the slotted orientation apparatus 2510 (e.g., only partially through the wall).

The multilateral junction 2500, in the illustrated embodiment, additionally includes a tubular spacer 2520 positioned downhole of the slotted orientation apparatus 2510, a whipstock 2530 positioned downhole of the tubular spacer 2520, and a y-block 2540 positioned downhole of the whipstock 2530. In the embodiment of FIG. 25, the multilateral junction 2500 additionally includes a main bore leg 2550 and a lateral bore leg 2560 coupled to a downhole end of the y-block.

A keyed running tool (not shown) could be used to position (e.g., rotationally position) one or more features within the multilateral junction 2500. For example, the key(s) of the keyed running tool could slide within the slot of the slotted orientation apparatus 2510 to position the one or more features within the multilateral junction 2500. In at least one embodiment, the keyed running tool is configured to position the whipstock 2530 (e.g., a tubing exit whipstock "TEW") at a desired lateral and rotational position within the multilateral junction 2500. Notwithstanding the foregoing, the slotted orientation apparatus 2510 could be used to positioned different features within the multilateral junction 2500, or alternatively could be used to positioned different features not associated with the multilateral junction 2500.

Figures 26A, 26B:
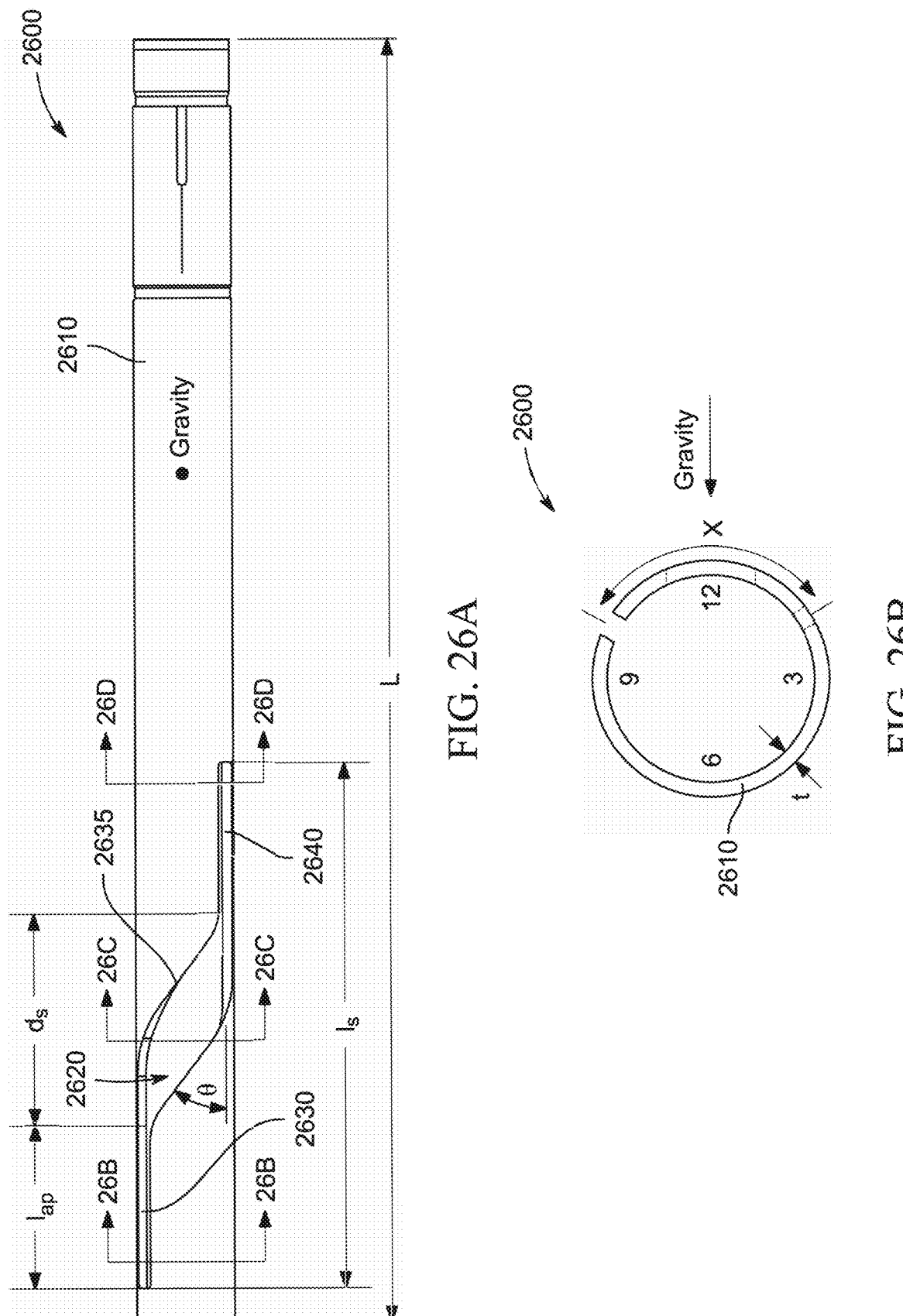
FIGS. 26A through 26I illustrate various different views of a slotted orientation apparatus designed, manufactured, and operated according to one or more embodiments of the disclosure.
Figures 26C, 26D:
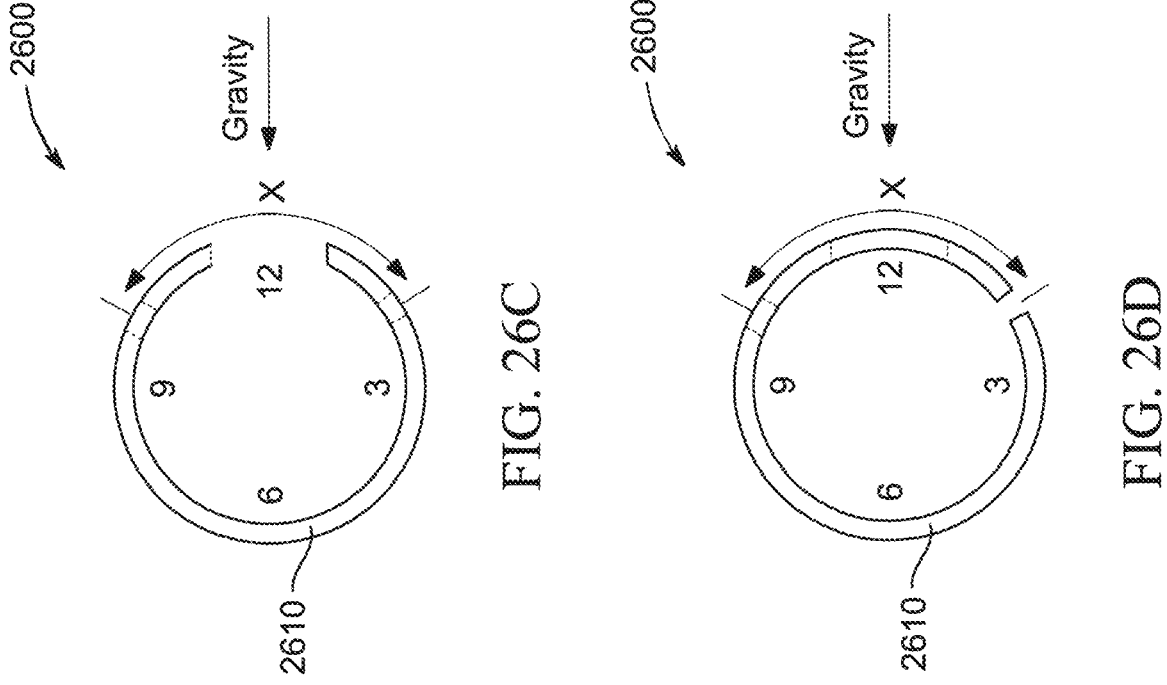
Figures 26E, 26F:
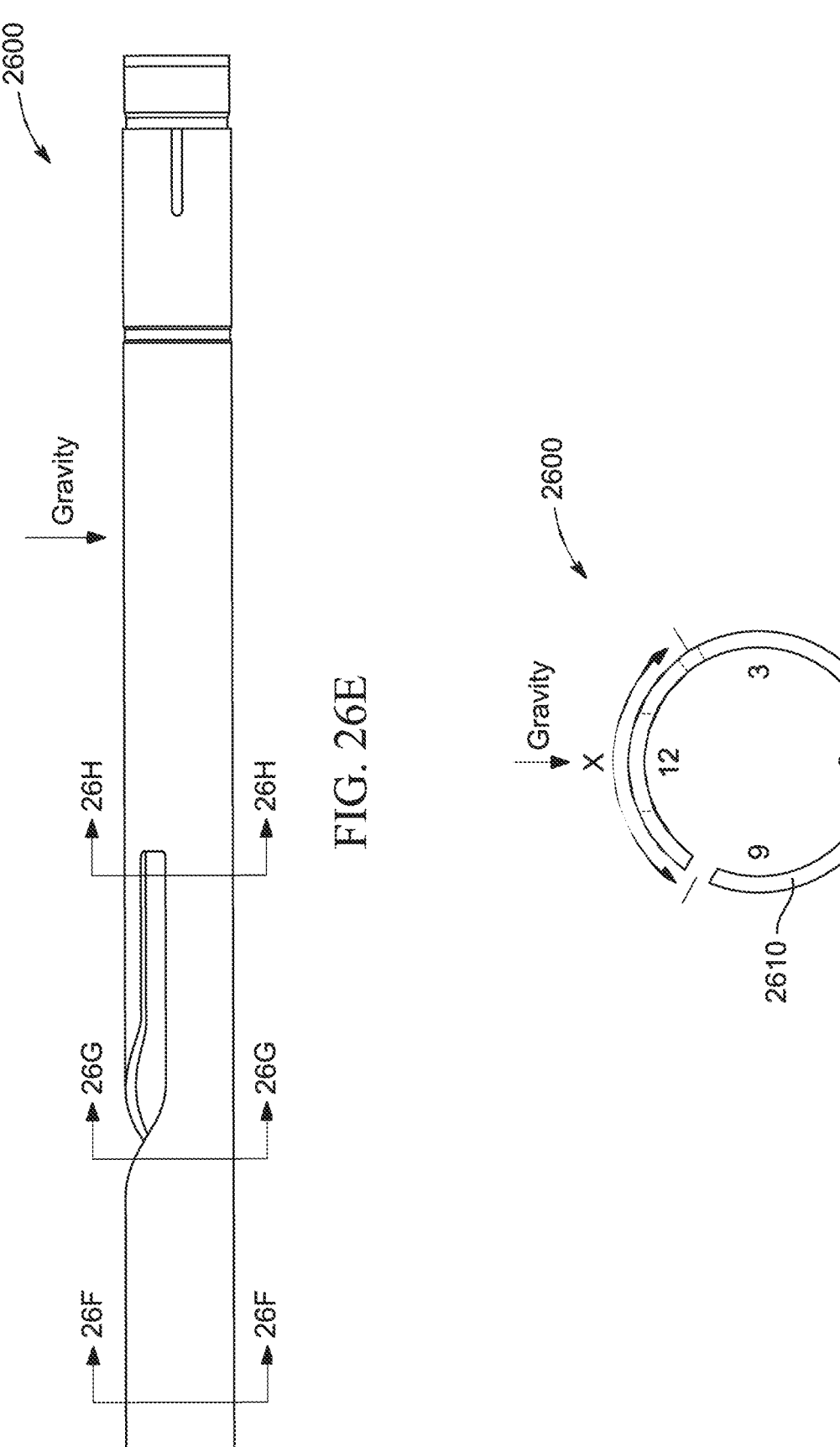
Figures 26G, 26H:
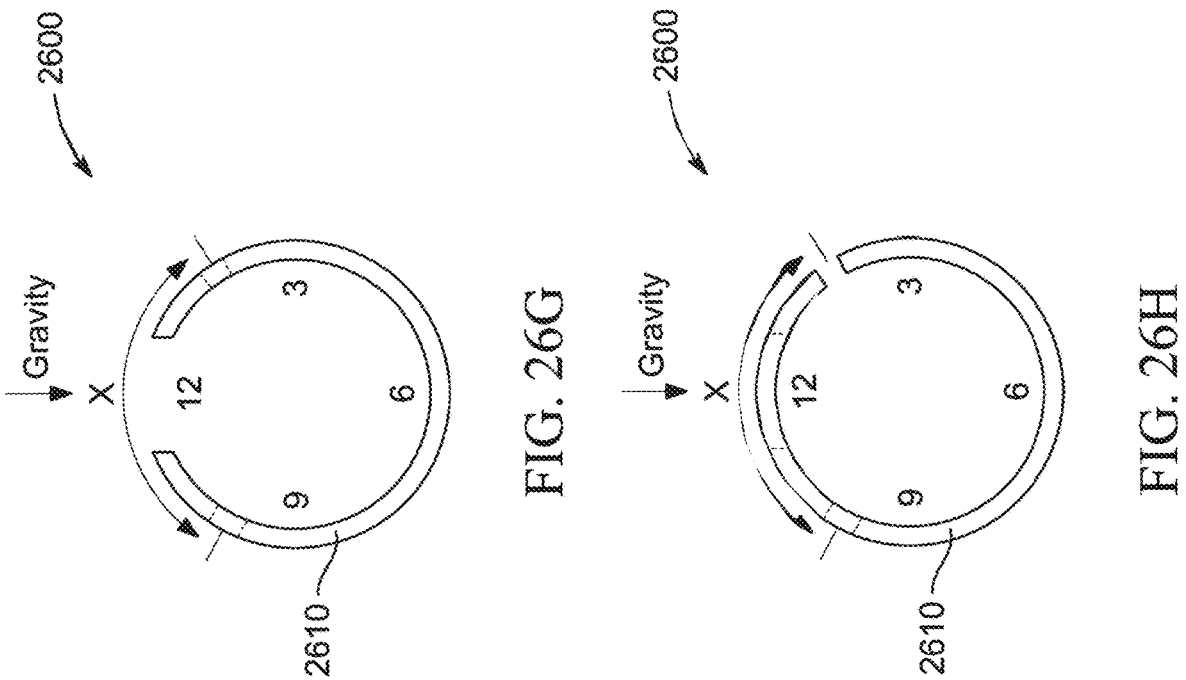
Figure 26I:
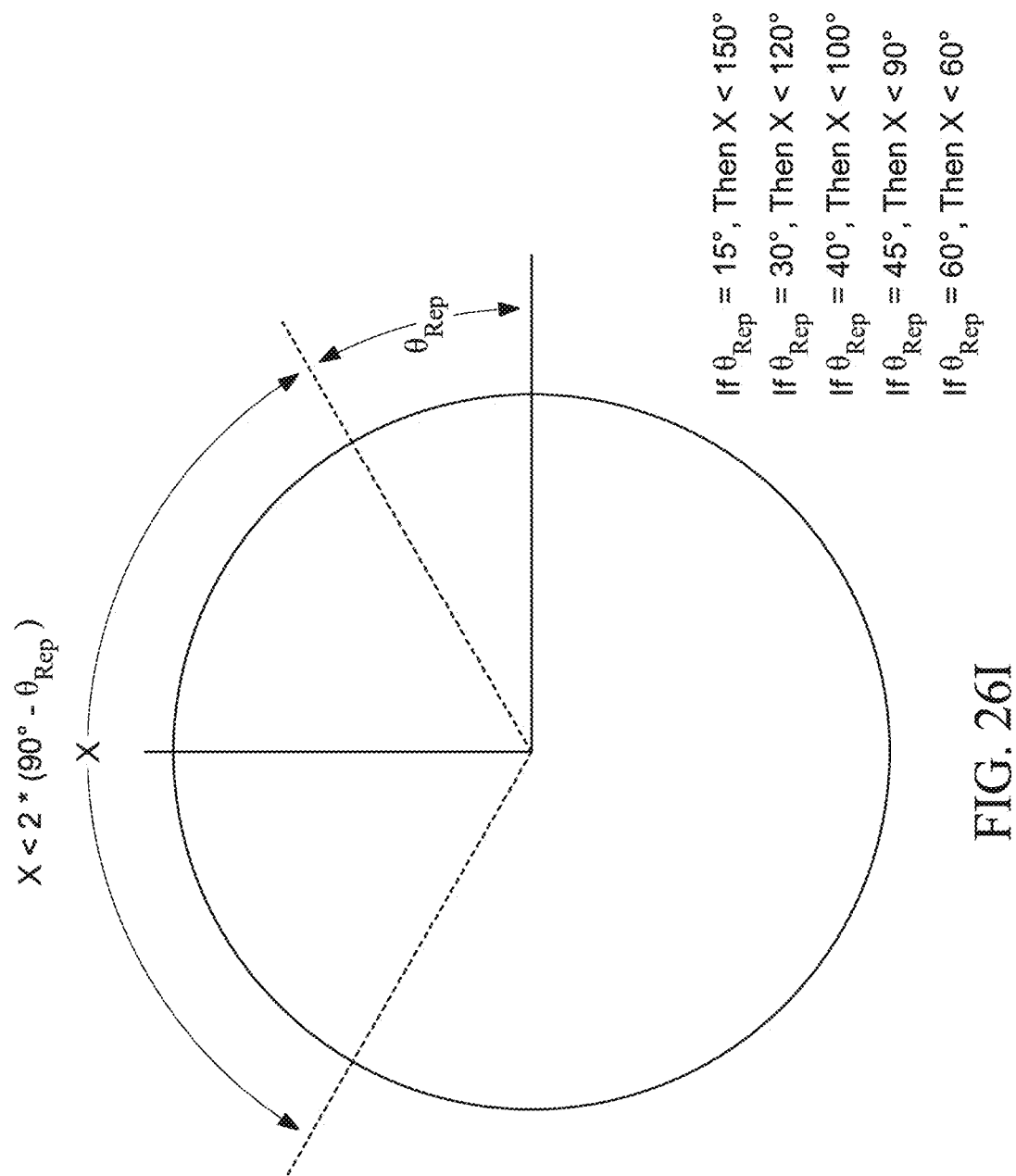

Turning to FIGS. 26A through 26H, illustrated are various different views of a slotted orientation apparatus 2600 designed, manufactured, and operated according to one or more embodiments of the disclosure. FIG. 26A illustrates a top-down view of the slotted orientation apparatus 2600, whereas FIGS. 26B through 26D illustrate various different sectional views of the slotted orientation apparatus 2600 taken through the top-down view of FIG. 26A. In contrast, FIG. 26E illustrates a right-side view of the slotted orientation apparatus 2600, whereas FIGS. 26F through 26H illustrate various different sectional views of the slotted orientation apparatus 2600 taken through the right-side view of FIG. 26E. Each of the views illustrated in FIGS. 26A through 26H additionally illustrate clock settings, as would relate to the illustrated point of gravity. The slotted orientation apparatus 2600, in at least one embodiment, is configured for use with a keyed running tool, such as that discussed below, and may be positioned within another tubular, such as casing.

The slotted orientation apparatus 2600, in the embodiment illustrated in FIGS. 26A through 26H, includes a tubular 2610 having a wall thickness (t). Many different tubular materials, and wall thicknesses (t), may be used for the tubular 2610 and remain within the scope of the disclosure. Nevertheless, in at least one embodiment, the tubular 2610 is a steel tubular, and the wall thickness (t) ranges from 0.07 cm to 5 cm. Furthermore, in at least one embodiment, the tubular could have a length (1) ranging from 5 cm to 18.5 m.

In accordance with at least one other embodiment of the disclosure, the slotted orientation apparatus 2600 includes a slot 2620 extending through the tubular 2610. In one or more embodiments, the slot 2620 has first and second axial portions 2630, 2640 laterally offset from one another by a distance $(d_s)$, and an angled portion 2635 connecting the first and second axial portions 2630, 2640. The slot 2620, in at least one embodiment, radially extends around the tubular 2610 by X degrees, wherein X is 180 degrees or less. In at least one other embodiment, X is less than 180 degrees. In yet another embodiment, such as shown in FIGS. 26A through 26H, X is 120 degrees or less, and in one embodiment 120 degrees. In even yet another embodiment, X is 90 degrees or less. As will be discussed in greater detail below, the actual degrees for X may relate to the number of keys employed in the keyed running tool. For example, if three equally spaced keys are used, X would equal 120 degrees. If four equally spaced keys were used, X would equal 90 degrees. If five equally spaced keys were used, X would equal 72 degrees.

The angle X may also be based upon the coefficient of friction between the material within the tubular 2610 (e.g., frac sand, coated frac proppant, formation fines, etc.) and the angled surfaces of the slot 2620, as well as the angle of repose of the material within the tubular 2610. For example, in at least one embodiment, frac sand is being deployed down the tubular 2610. Accordingly, the frac sand might have an angle of repose of Z degrees (e.g., wet sand has an angle of repose of 45 degrees), and the angle X might be chosen based upon the aforementioned coefficient of friction and the angle of repose of Z degrees (e.g., say for example 45 degrees). Thus, the combination of the coefficient of friction between the frac sand and the lower ledge of the slot 2620, along with the angle of repose of Z degrees, would cause the frac sand to not collect on the angled surfaces of the slot 2620.

As an example, the angle X might be less than twice a complementary angle of repose of the material within the tubular 2610 (e.g., X<2*(90°-angle of repose of material, or $\theta_{Rep}$)) when a radial center point of the slot 2620 is positioned at 12 o'clock relative to gravity, as shown in FIG. 261. In one embodiment, the material might have an angle of repose $(\theta_{Rep})$ of at least 15 degrees (e.g., water filled sand), and the angle X would be less than 150 degrees (e.g., X<2*(90°-15°). In another embodiment, the material might have an angle of repose $(\theta_{Rep})$ of at least 260 degrees (e.g., water filled sand), and the angle X would be less than 120 degrees (e.g., X<2*(90°-30°). In yet another embodiment, the material might have an angle of repose $(\theta_{Rep})$ of at least 40 degrees, and the angle X would be less than 100 degrees (e.g., X<2*(90°-40°). In yet another embodiment, the material might have an angle of repose $(\theta_{Rep})$ of at least 45 degrees, and the angle X would be less than 90 degrees (e.g., X<2*(90°-45°).

The slot 2620, in certain embodiments, is located on a high side of the tubular 2610 such that no portion of the slot 2620 is located below 3 o'clock or below 9 o'clock relative to gravity. In such embodiments, X would need to be less than 180 degrees to accommodate a width of the first and second axial portions 2630, 2640. For example, depending on the width of the first and second axial portions 2630,

2640, X might need to be 175 degrees or less to accommodate the aforementioned high side. In certain other embodiments, such as that shown in FIGS. 26A through 26H, a radial center point of the slot 2620 is positioned at 12 o'clock relative to gravity.

Further to the embodiment of FIGS. 26A through 26H, the slot 2620 may have a length ($l_s$), and the first and second axial portions may have a length ($l_{ap}$). Thus, in accordance with one or more embodiments, the length ($l_s$) ranges from 2.5 cm to 900 cm and the length ($l_{ap}$) ranges from 1 cm to 600 cm. Similarly, in an embodiment, the distance ($d_s$) ranges from 1 cm to 900 cm, among others. Given certain dimensions of the slot 2620, an angle ($\theta$) of the angled portion 2635 may range from 15 degrees to 60 degrees, and in yet another embodiment from 25 degrees to 50 degrees.

Figure 27A:
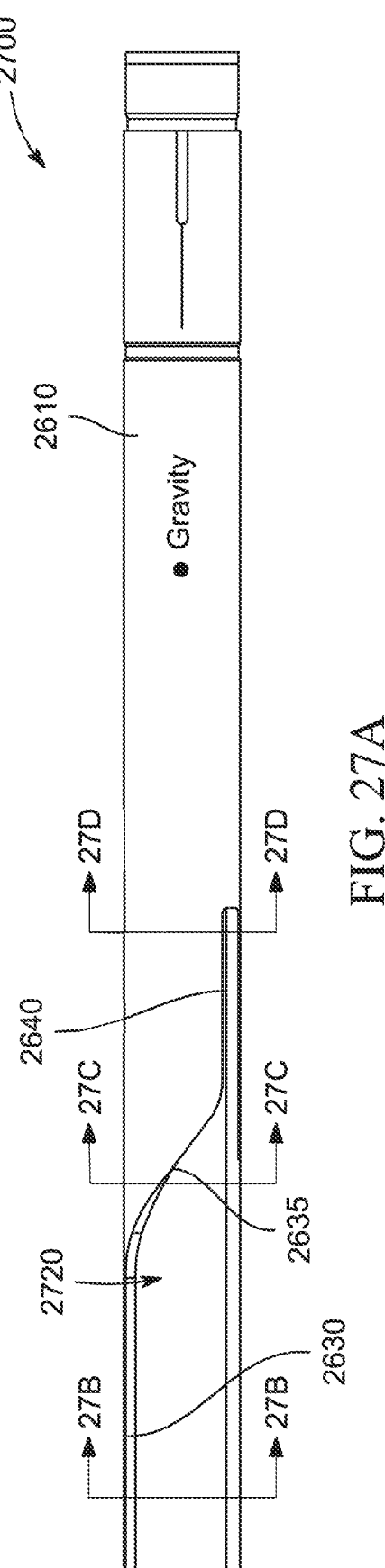
FIGS. 27A through 27D illustrate various different views of a slotted orientation apparatus designed, manufactured, and operated according to one or more alternative embodi-ments of the disclosure.
Figure 27B:
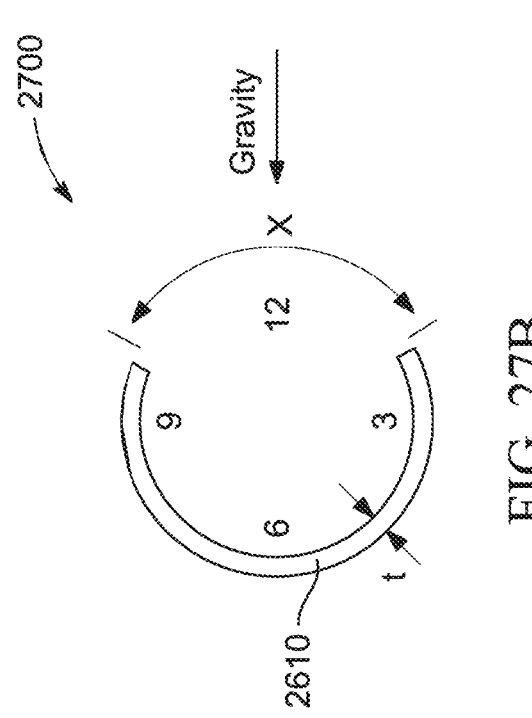
Figures 27C, 27D:
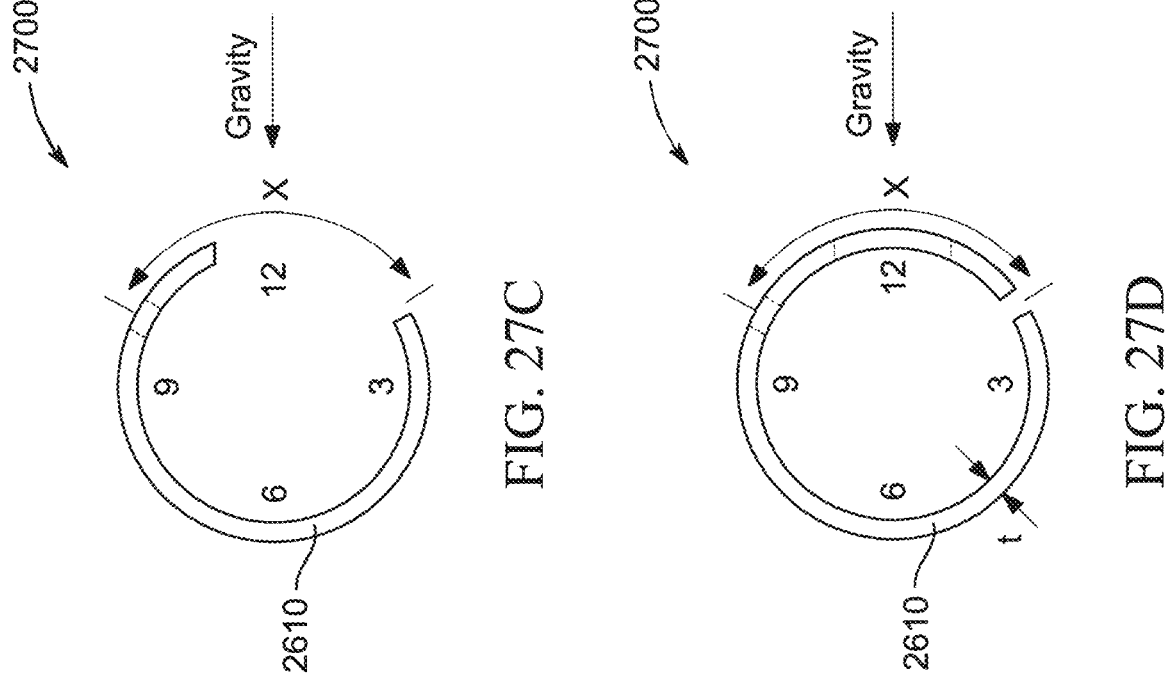

Turning to FIGS. 27A through 27D, illustrated are various different views of a slotted orientation apparatus 2700 designed, manufactured, and operated according to one or more alternative embodiments of the disclosure. FIG. 27A illustrates a top-down view of the slotted orientation apparatus 2700, whereas FIGS. 27B through 27D illustrate various different sectional views of the slotted orientation apparatus 2700 taken through the top-down view of FIG. 27A. The slotted orientation apparatus 2700 is similar in many respects to the slotted orientation apparatus 2600. Accordingly, like reference numbers have been used to indicate similar, if not identical, features. For example, the slotted orientation apparatus 2700 includes the first axial portion 2630, the angled portion 2635, and the second axial portion 2640. Nevertheless, the slotted orientation apparatus 2700 employs an open-type slot 2720, as opposed to the more closed-type slot 2620 of the slotted orientation apparatus 2600.

Figure 28A:
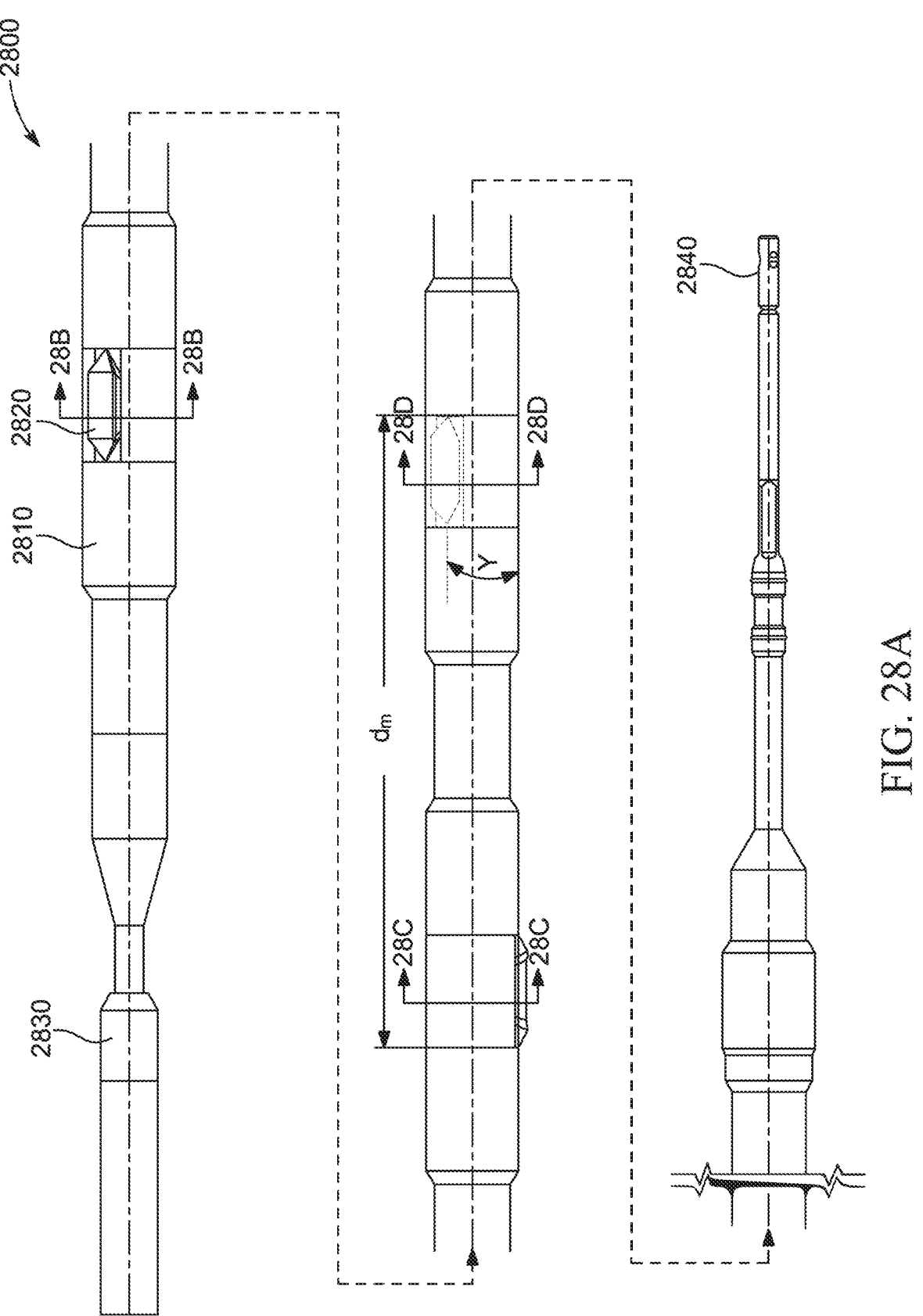
FIGS. 28A through 28D illustrate different views of a keyed running tool designed, manufactured and operated according to one or more embodiments of the disclosure.
Figure 28A:
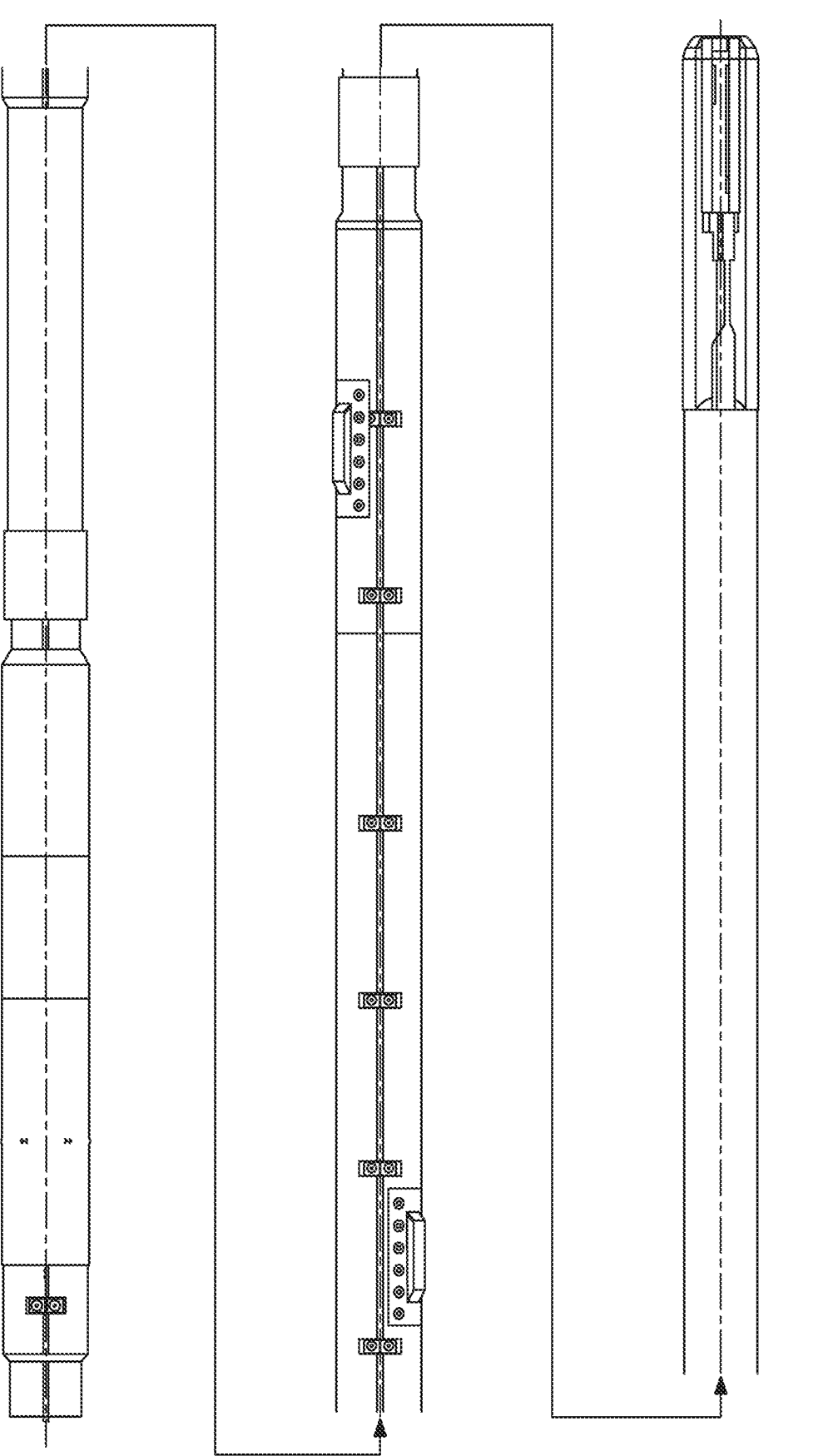
Figure 28B:
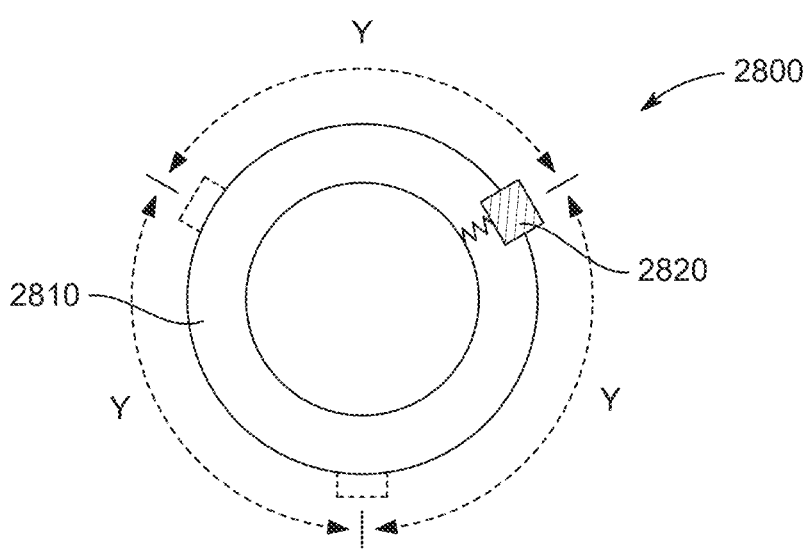
Figure 28C:
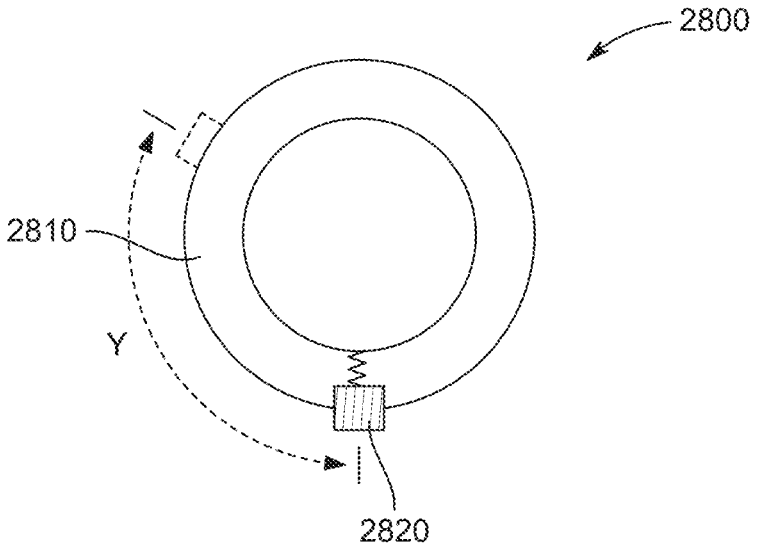
Figure 28D:
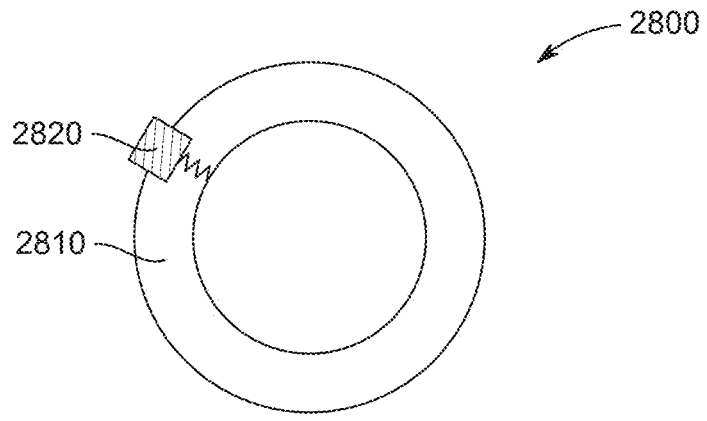

Turning to FIGS. 28A through 28D, illustrated are different views of a keyed running tool 2800 designed, manufactured and operated according to one or more embodiments of the disclosure. FIG. 28A illustrates an isometric view of the keyed running tool 2800, whereas FIGS. 28B through 28D illustrated cross-sectional views taken at various different locations of the keyed running tool 2800. The keyed running tool 2800, in at least one embodiment, is configured for use with a slotted orientation apparatus, such as the slotted orientation apparatus 2600 illustrated above with regard to FIGS. 26A through 27D.

The keyed running tool 2800 illustrated in FIGS. 28A through 28D, in one or more embodiments, includes a housing 2810. The housing 2810 may comprise many different shapes, lengths and/or materials while remaining within the scope of the disclosure. In at least one embodiment, however, the housing 2810 comprises steel. Housing 2810 may comprise more than one component in order to perform its function (securing the more than one key, alignment of the keys, attaching the main housing to tools at one or both ends.

The keyed running tool 2800, in accordance with one embodiment of the disclosure, includes two or more keys 2820 extending from the housing 2810. The two or more keys 2820, in certain embodiments, are movable between a radially retracted state (e.g., where they may be flush with an outside diameter of the housing 2810) and a radially extended state (e.g., such as shown, where they extend beyond the outside diameter of the housing 2810). For example, the two or more keys 2820 may be two or more spring loaded keys 2820, and remain within the scope of the disclosure. In the embodiment of FIGS. 28A through 28D, the keyed running tool 2800 includes three keys 2820.

In accordance with one embodiment of the disclosure, adjacent ones of the two or more keys 2820 are radially offset from each other by Y degrees, wherein Y is 180 degrees or less. For example, depending on the number of keys 2820, Y may vary. For example, if three equally spaced keys are used, Y would equal 120 degrees. If four equally spaced keys were used, Y would equal 90 degrees. If five equally spaced keys were used, Y would equal 72 degrees. In certain instances, it may be advantageous to have an odd number of equally spaced keys, such that no two keys are radially offset from one another by 180 degrees. In certain instances, it may be advantageous to have the three-or-more keys spaced at different angles from one another. For example, if the assembly that needs to be urged into a certain orientation, but its center of mass is not positioned along the centerline, then having two keys engaged at a particular orientation can distribute the stresses over a larger area to reduce the stresses upon the keys (and slots). Likewise, the keys may be made wider to increase the load-bearing area of the keys to reduce the stresses upon the keys and orientation slot.

In accordance with one embodiment of the disclosure, adjacent ones of the two or more keys 2820 are laterally offset from each other. For example, adjacent ones of the two or more keys are laterally offset from each other by a maximum distance ($d_m$). In at least one embodiment, the maximum distance ($d_m$) ranges from 2.5 cm to 900 cm. Nevertheless, other values for the maximum distance ($d_m$) are within the scope of the disclosure.

In certain embodiments, the value for the Y (e.g., the radial offset of the keys 2820) and the value for X (e.g., how far the slot of the slotted orientation apparatus radially extends around the tubular) relate to one another. For example, certain embodiments exist wherein the value for Y is substantially equal to the value for X. The term "substantially equal," as used herein with respect to the associated values for Y and X, means that the values are within 10 percent of one another, for example to accommodate a width of the key 2820. In other embodiments, the value for Y is ideally equal to the value for X. The term "ideally equal," as used herein with respect to the associated values for Y and X, means that the values are within 5 percent of one another, for example to accommodate a width of the key 2820. In yet other embodiments, the value for Y is exactly equal to the value for X. The term "exactly equal," as used herein with respect to the associated values for Y and X, means that the values are within 1 percent of one another.

Similarly, in certain embodiments, the maximum distance ($d_m$) (e.g., the maximum lateral offset of adjacent key 2820) and the length ($l_s$) of the slot of the slotted orientation apparatus relate to one another. For example, in certain embodiments it is beneficial for two or more of the keys 2820 to reside within the slot at the same time. Accordingly, in at least one embodiment, the maximum distance ($d_m$) is less than the length ($l_s$). However, in certain other embodiments it is beneficial for the two or more keys 2820 to reside within the first and second axial portions of the slot, respectively, thus the maximum distance ($d_m$) is greater than the distance ($d_s$) (e.g., the lateral distance between the first and second axial portions).

The keyed running tool 2800, in one or more embodiments, may additionally include a swivel 2830 coupled to an uphole end of the housing 2810. In at least one embodiment, the swivel 2830 is configured to allow the housing 2810 and the two or more keys 2820 to rotate when following a slot in a slotted orientation apparatus. The keyed running tool 2800 may additionally include an engagement member 2840 coupled to a downhole end of the housing 2810. The engagement member 2840, in at least one embodiment, is configured to engage with a downhole tool and rotationally position the downhole tool within a wellbore within which it is located. For example, the engagement member 2840 could engage with a whipstock, such as the whipstock 230 illustrated in FIG. 25, in which case the keyed running tool 2800 would be used to rotationally position the whipstock 2530 within the multilateral junction 200. The keyed running tool 2800 may be used in other processes or phases of constructing and producing hydrocarbons such as, but not limited to: during production, completion, stimulation, workover, re-drilling, and/or fracturing operations, etc. In one or more embodiments, engagement member 2840 may comprise an Energy Transfer Mechanism (ETM), an Orientation Device, Communication Device, a Wet Mate, Dry Mate, a Fiber Optic Coupler (Wet Mate) like the ones mentioned in this application. In some embodiments, engagement member 2840 may comprise ETM, Orientation or Communication Device, Wet Mate, Dry Mate, Fiber Optic Coupler different than the ones mentioned in this application. Engagement member 2840 may comprise a mechanical device (such as a collet, spring, a dashpot, a shoulder, debris excluder, barrier, pressure barrier, a reservoir, an accumulator, a profile, etc.), an electrical device (a resistor, capacitor, battery, sensor, switch, etc.), a fluidic device (reservoir, accumulator, a choke, a poppet, a line, a burst disc, a vent, logic device, amplifiers, triodes, amplifier, oscillator, etc.), an electronic device (a computer, a chip, a sensor, an energy convertor, memory storage, logic chip/device, MEMS, etc.), a power supply line (i.e. electrical, hydraulic, fiber, heat, etc.), a power transfer line (i.e. electrical, hydraulic, fiber, heat, etc.), etc.

Turning now to FIGS. 29A through 29F, illustrated is one embodiment for aligning a downhole tool in accordance with the disclosure. For example, the embodiment for aligning a downhole tool could include employing a slotted orientation apparatus 2900 and a keyed running tool 2950 for aligning a downhole tool. In at least one embodiment, the slotted orientation apparatus 2900 and the keyed running tool 2950 are similar to the slotted orientation apparatus 2600 and the keyed running tool 2800 discussed above. Thus, in at least one embodiment, the slotted orientation apparatus 2900 could include a tubular 2910, as well as a slot 2920 extending through the tubular, the slot having first and second axial portions 2930, 2940 laterally offset from one another by a distance ($d_s$), and an angled portion 2935 connecting the first and second axial portions 2930, 2940. In accordance with at least one embodiment, the slot 2920 radially extends around the tubular 2910 X degrees, wherein X is 180 degrees or less. Similarly, in at least one embodiment, the keyed running tool 2950 could include a housing 2960, as well as two or more keys 2970 extending from the housing 2960, the two or more keys 2970 movable between a radially retracted state and a radially extended state. In accordance with at least one embodiment, adjacent ones of the two or more keys 2970 are laterally offset from each other and radially offset from each other by Y degrees, wherein Y is 180 degrees or less. The slotted orientation apparatus 2900 may comprise one or more slots or features to enhance functional requirements and reliability of the apparatus and system. In some embodiments, one or more sets of axial and helical slots. For example, 2900 may comprise 3 sets of axial slots (2930 and/or 2940) and/or (angled/helical) slots (2920, 2935, etc.). One benefit of having 3 sets of slots is that if there are 3 keys (e.g., 2970*a*, *b*, *c*), more than one key may engage more than one slot.

This in turn can reduce the amount of stress placed on one key and slot during the orienting/alignment process. In addition, the torque generated by more than one key would be less and distributed around the axis of tool 2950 and components/assemblies attached to it. As a one example, referring to FIG. 29D, another slot or slots may be positioned so that Key 2970*a* could engage at least one of the slots in unison with key 2970*b* engaging slot(s) 2930, 2920, 2940, etc. In some embodiments, when key 2970*c* is engaging a slot (e.g., as shown in FIG. 29E), keys 2970*a* and/or 2970*b* may be engaging one or more other slots.

In the embodiment of FIGS. 29A through 29F, the slot 2920 of the slotted orientation apparatus 2900 radially extends around the tubular 2910 by 120 degrees. Similarly, the keyed running tool 2950 includes three keys, including a downhole key 2970*a*, a middle key 2970*b*, and an uphole key 2970*c*. Further to the embodiment of FIGS. 29A through 29F, the downhole key 2970*a*, middle key 2970*b*, and uphole key 2970*c* are radially offset from each other by 120 degrees. While a three key 2970 and 120 degree design is being illustrated and described with regard to FIGS. 29A through 29F, other number of keys 2970 and radial spacing are within the scope of the disclosure.

Figure 29A:
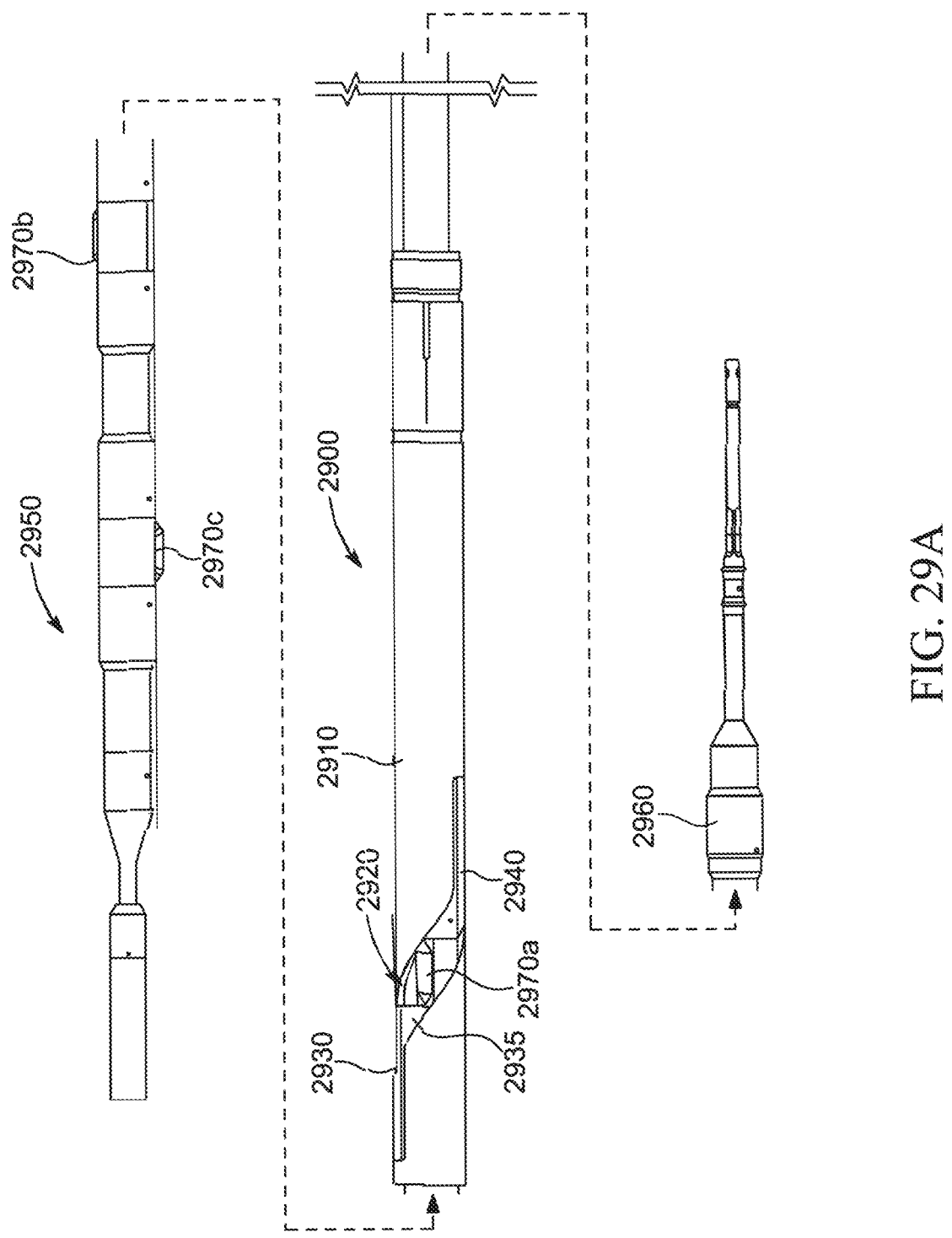
FIGS. 29A through 29F illustrate one embodiment for aligning a downhole tool in accordance with the disclosure, and FIGS. 29A' through 29F' illustrate an alternative embodiment to that shown in FIGS. 29A through 29F.
Figure 29A:
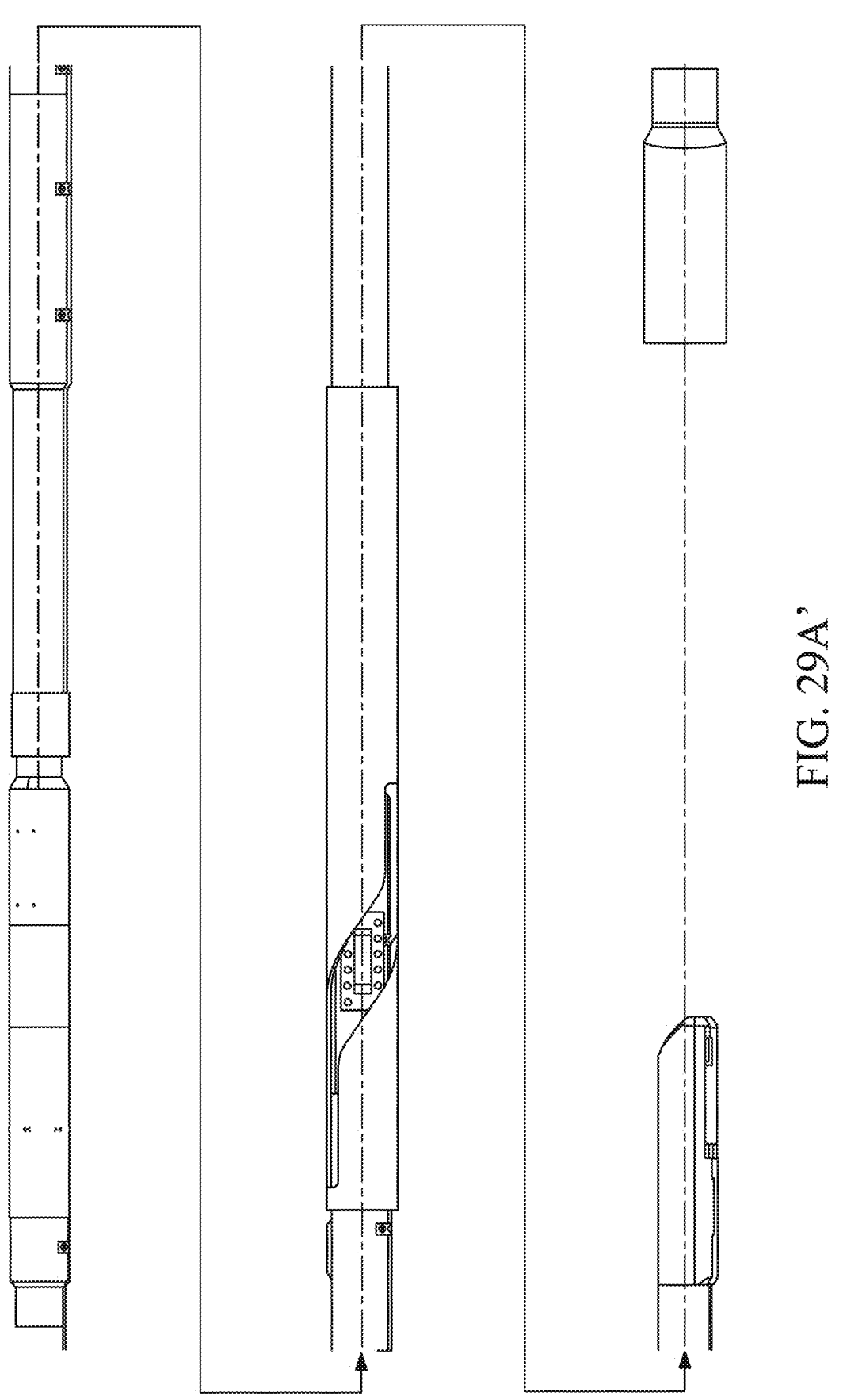

With reference to FIG. 29A, the keyed running tool 2950 is initially at least partially engaged with the slotted orientation apparatus 2900. For example, in the embodiment of FIG. 29A, the downhole key 2970*a* is laterally aligned with the slot 2920 when the keyed running tool 2950 is being pushed downhole. Thus, in the embodiment of FIG. 29A, the downhole key 2970*a* may engage with the slot 2920, as is shown. While FIG. 29A illustrates the downhole key 2970*a* positioned in the angled portion 2935 of the slot 2920, depending on the initial radial alignment between the downhole key 2970*a* and the slot 2920, the downhole key 2970*a* might alternatively initially engage the first axial portion 2930 or initially engage the second axial portion 2940. Additionally, as the keys 2970 are movable between radially retracted states and radially extended states, a location at which the keys 2970 engage with the slot 2920 has no effect on the keys 2970.

Figure 29B:
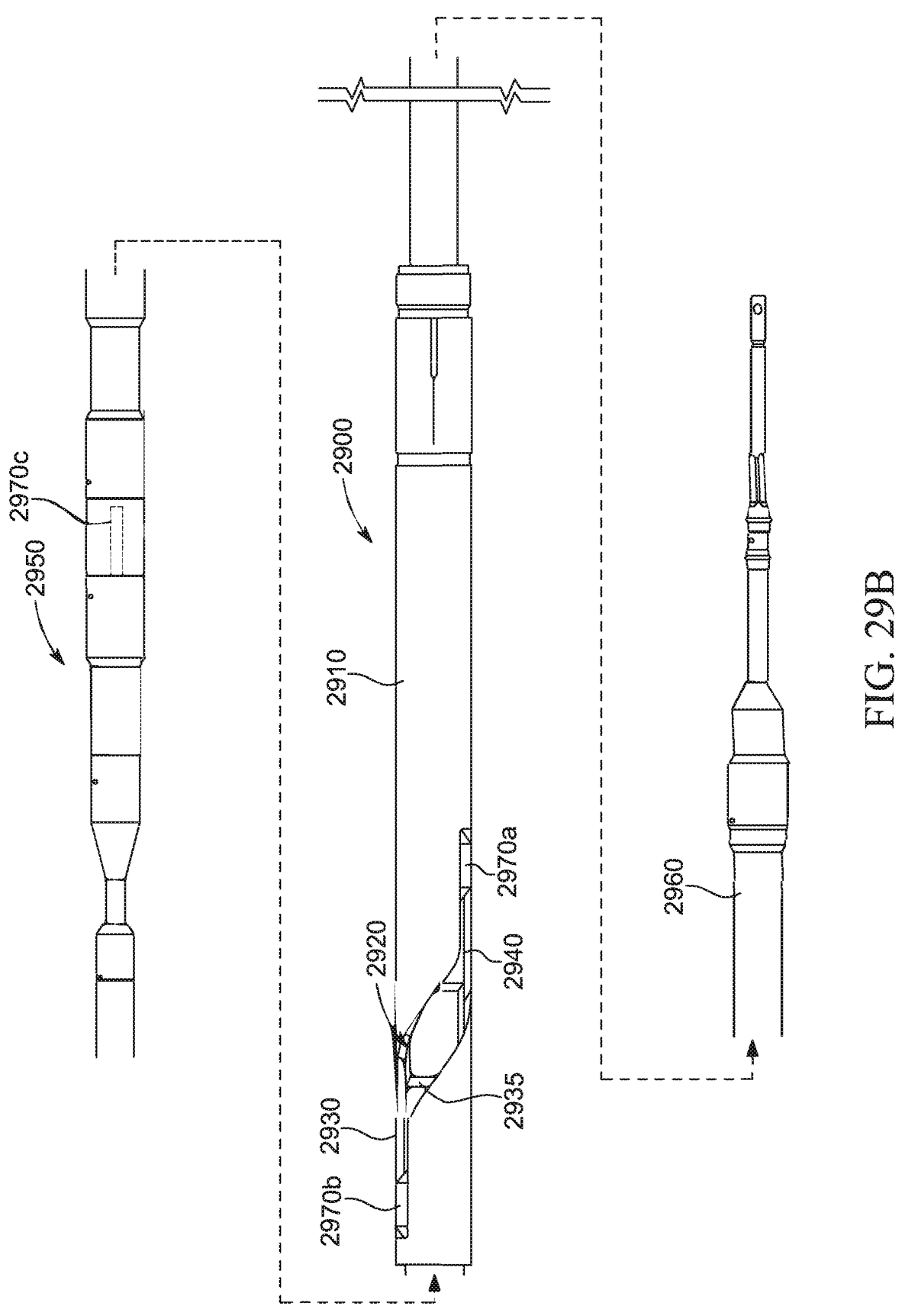

With reference to FIG. 29B, illustrated is the keyed running tool 2950 of FIG. 29A after continuing to push the keyed running tool 2950 downhole causing the downhole key 2970*a* to rotate within the slot 2920 until the downhole key 2970*a* is positioned within the second axial portion 2940 of the slot 2920 and the middle key 2970*b* is positioned within the first axial portion 2930 of the slot 2920. As the maximum distance ($d_m$) between the downhole key 2970*a* and the middle key 2970*b* is less than the length ($l_s$) of the slot 2920, both of the downhole key 2970*a* and the middle key 2970*b* may be simultaneously located within the slot 2920. Moreover, in certain embodiments, the relationship between the maximum distance ($d_m$) and the length ($l_s$) dictates that no more than two keys 2970 may be engaged with the slot 2920 at any one given moment in time. Furthermore, as the radial value for X is substantially similar to the radial value for Y, the downhole key 2970*a* and the middle key 2970*b* may be simultaneously located within second axial portion 2940 and the first axial portion 2930, respectively.

Figure 29C:
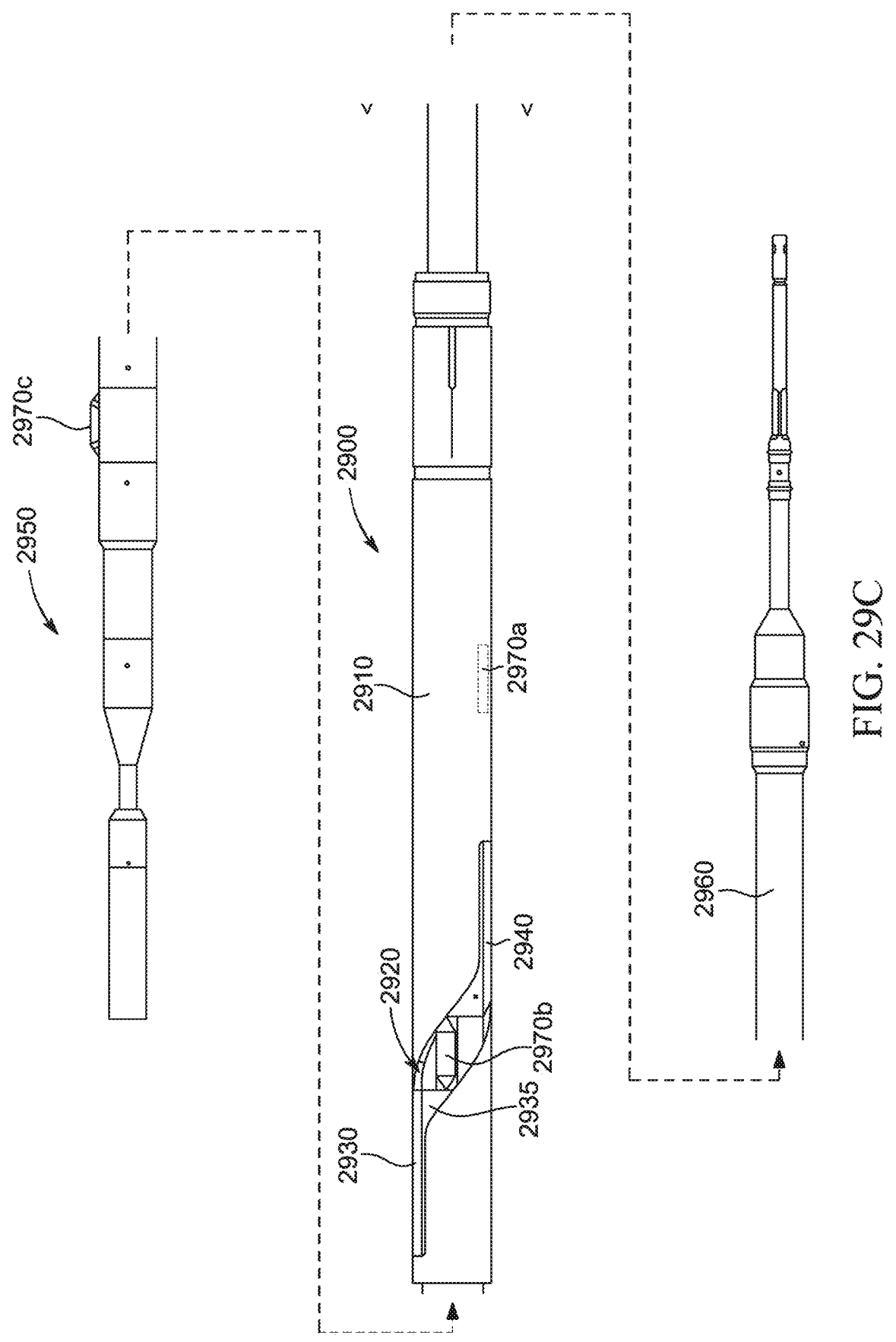
Figure 29C:
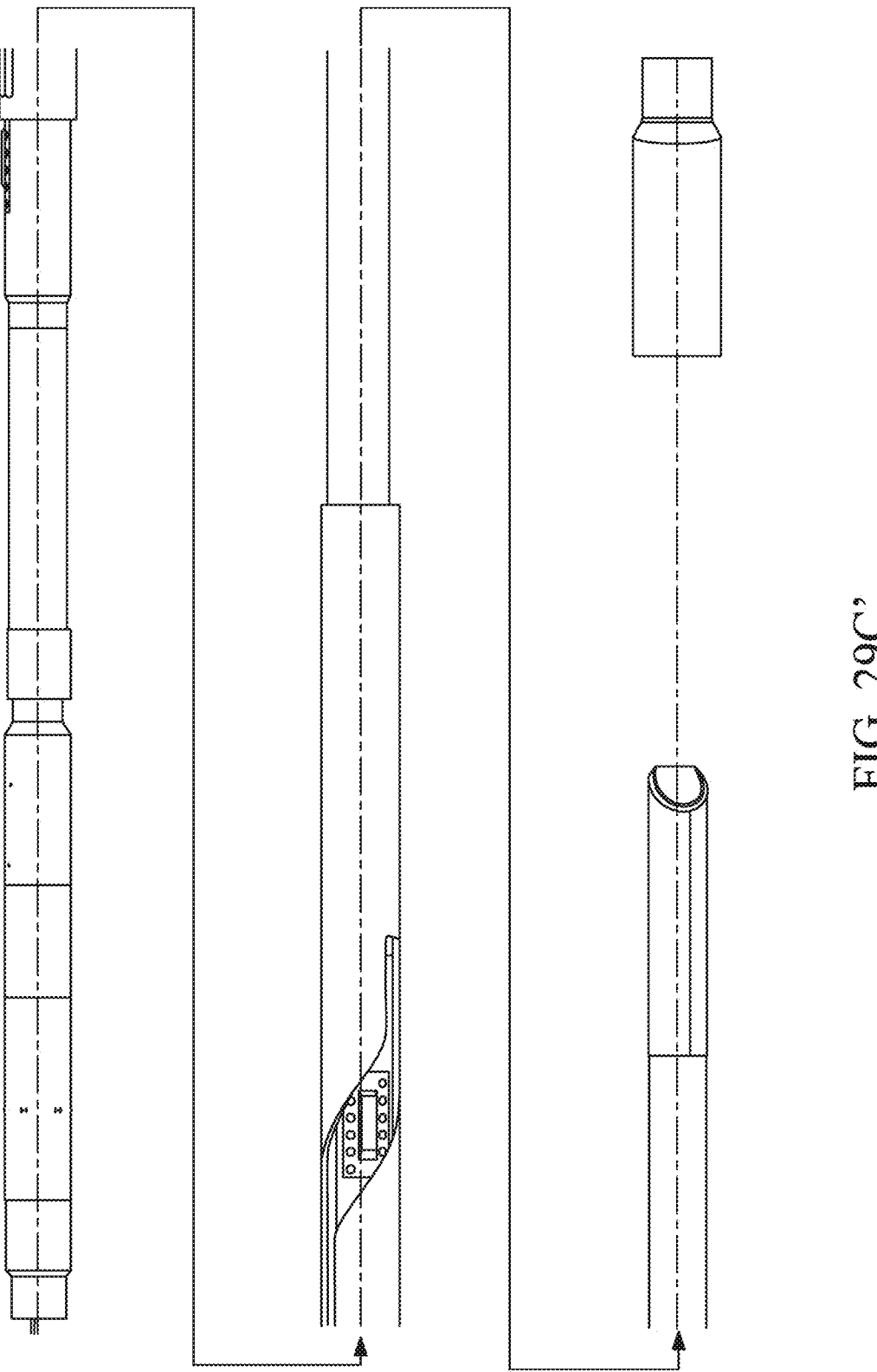

With reference to FIG. 29C, illustrated is the keyed running tool 2950 of FIG. 29B after continuing to push the keyed running tool 2950 downhole causing the downhole key 2970*a* to move to its radially retracted state (e.g., within the tubular 2910) and the middle key 2970*b* to rotate to the angled portion 2935 of the slot 2920. Given the spacing between adjacent keys 2970, in one or more embodiments, if one key (e.g., the middle key 2970*b*) is located within the angled portion 2935 of the slot 2920, an adjacent key 2970 (e.g., the downhole key 2970*a* or the uphole key 2970*c*) cannot also be located within the slot 2920.

Figure 29D:
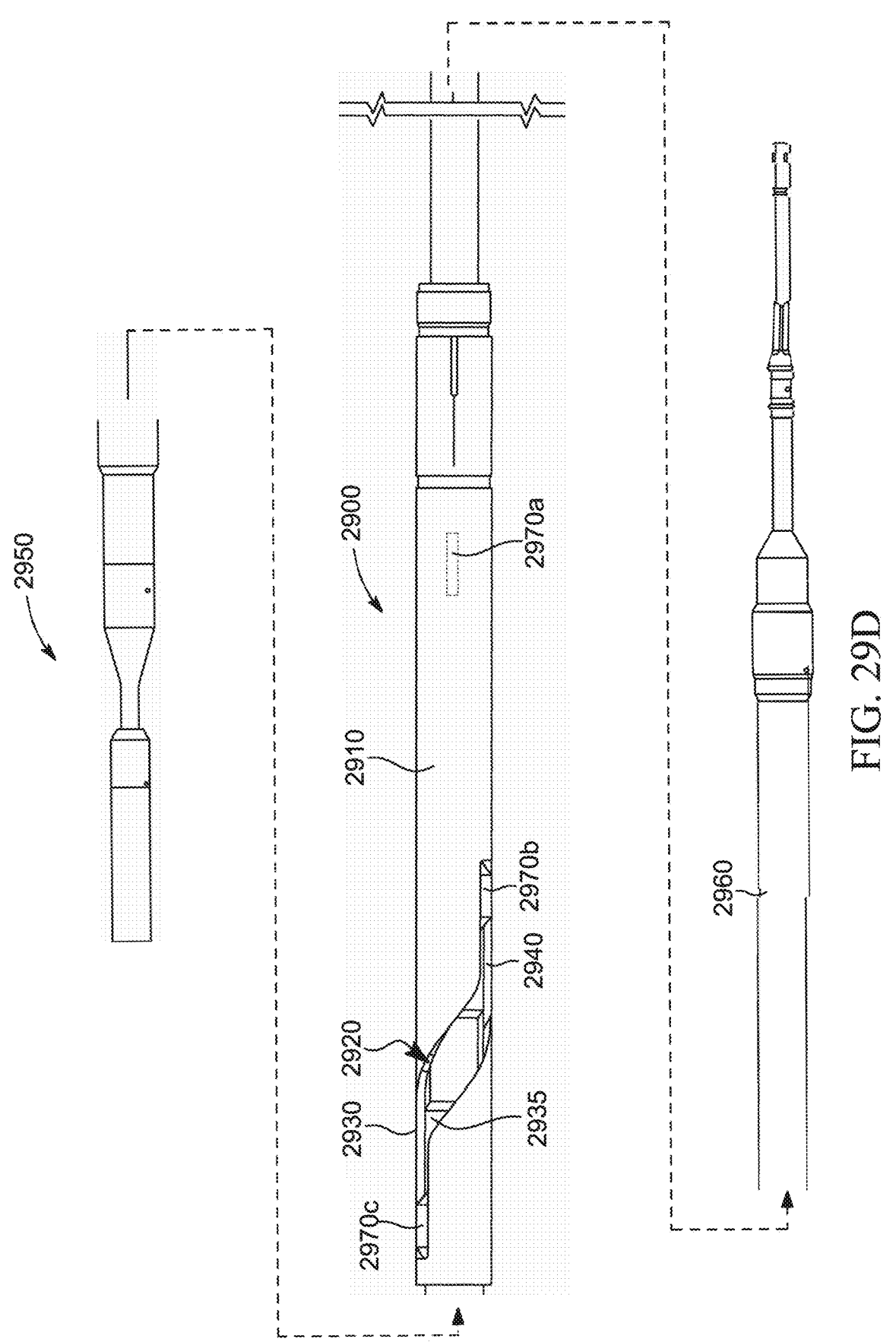
Figure 29D:
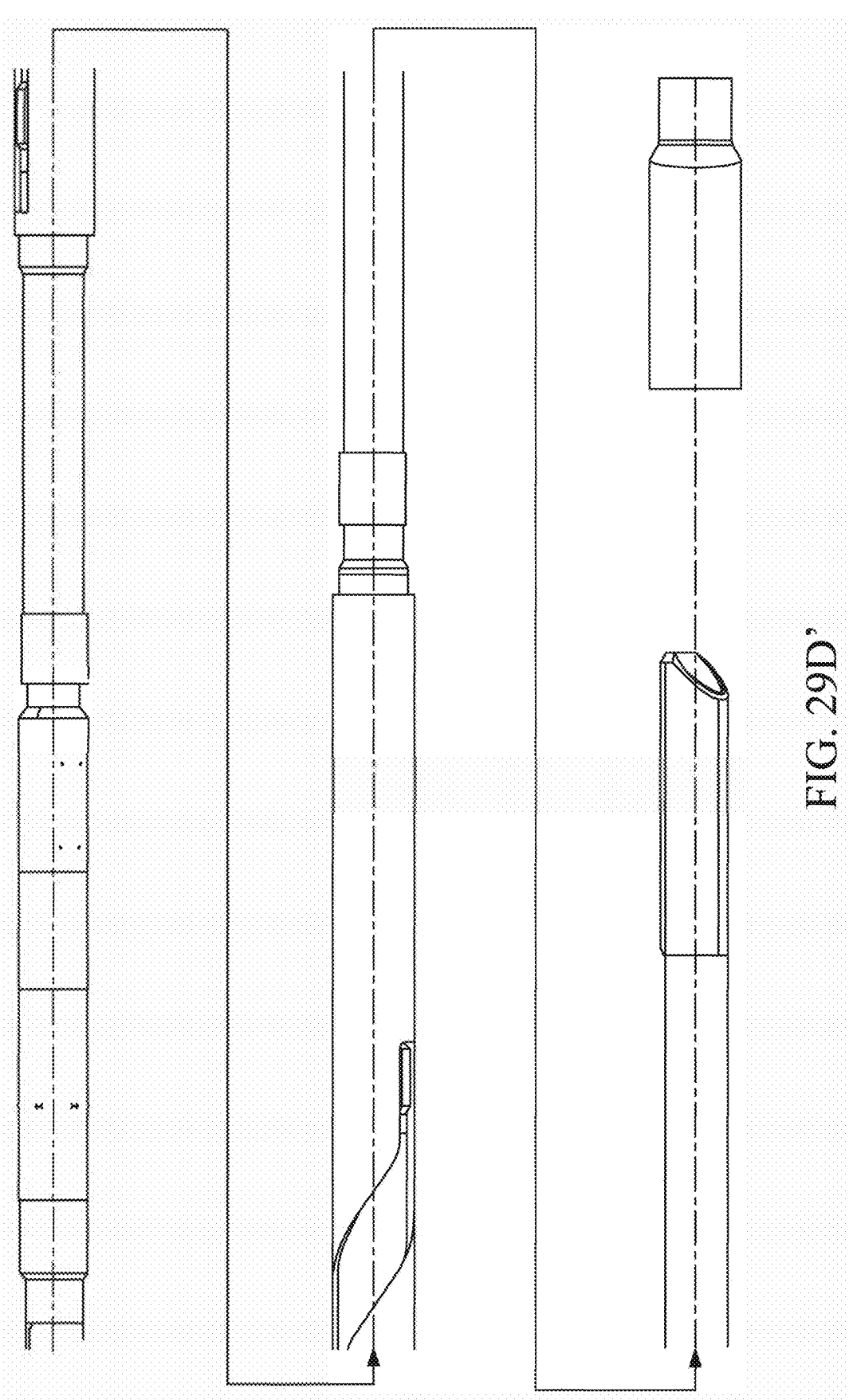
Figure 29E:
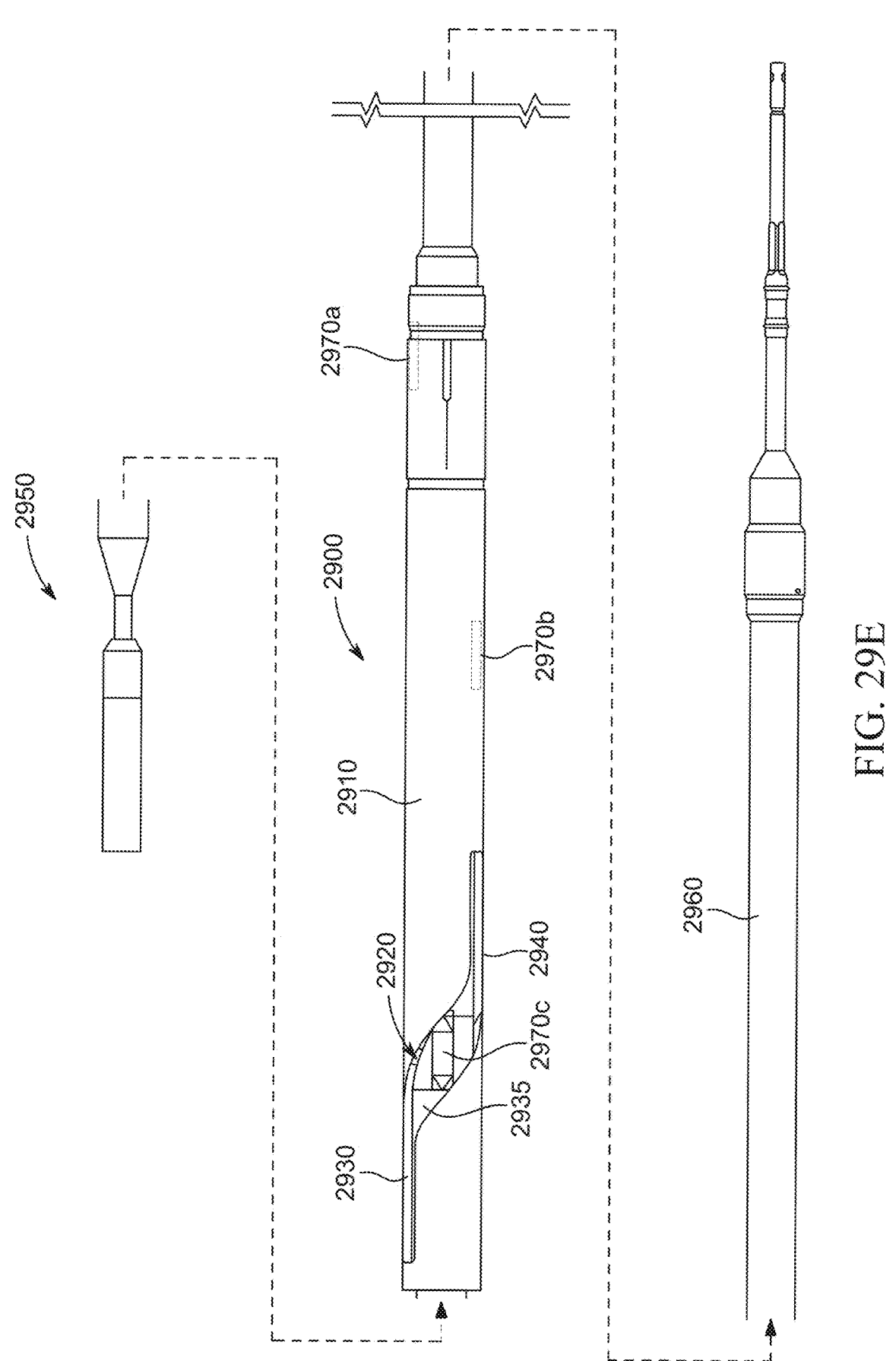
Figure 29E:
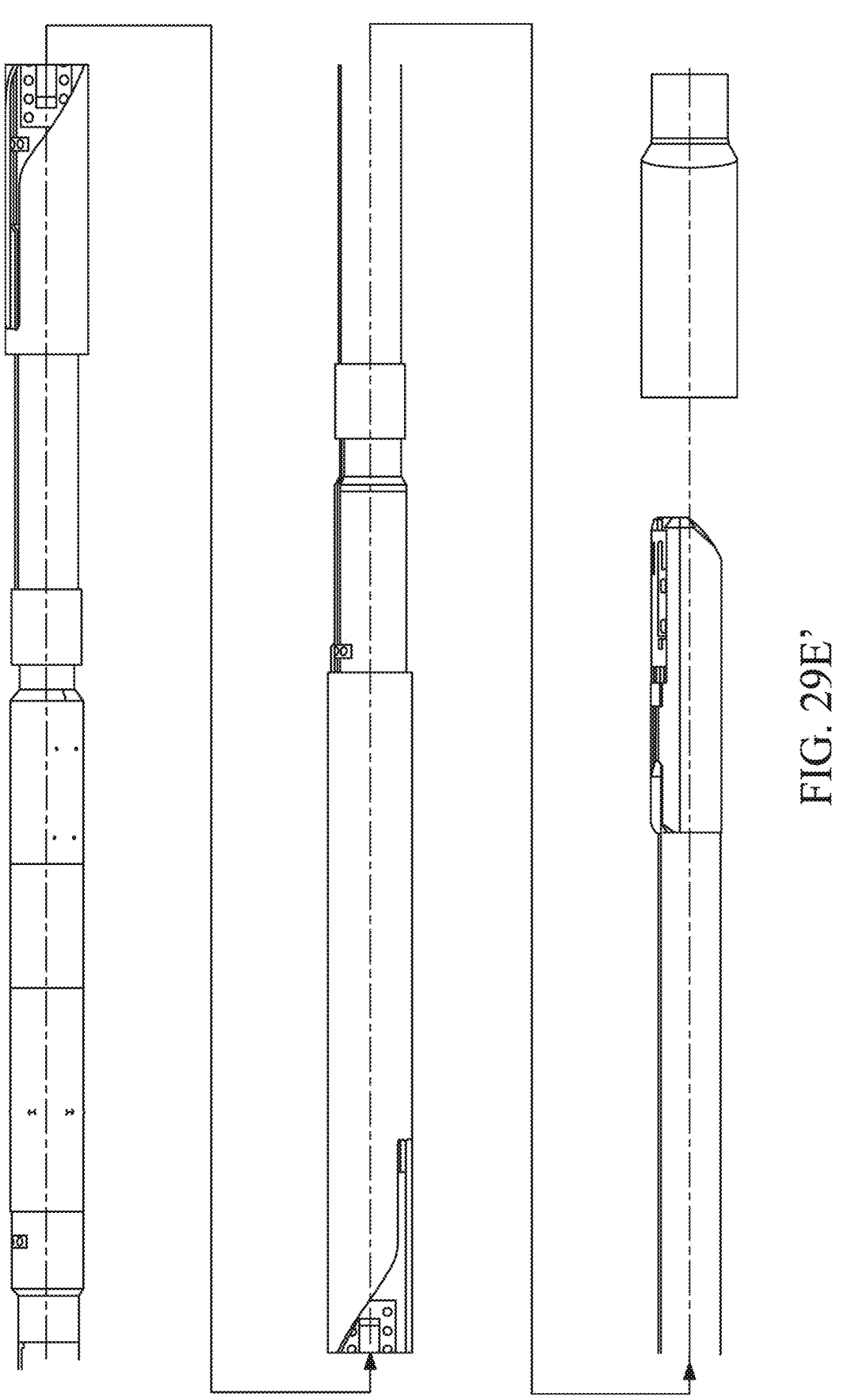

With reference to FIG. 29D, illustrated is the keyed running tool 2950 of FIG. 29C after continuing to push the keyed running tool 2950 downhole causing the middle key 2970*b* to rotate within the slot 2920 until the middle key 2970*b* is positioned within the second axial portion 2940 of the slot 2920 and the uphole key 2970*c* is positioned within the first axial portion 2930 of the slot 2920. As the maximum distance (d$_m$) between the middle key 2970*b* and the uphole key 2970*c* is less than the length (l$_s$) of the slot 2920, both of the middle key 2970*b* and the uphole key 2970*c* may be simultaneously located within the slot 2920. Furthermore, as the radial value for X is substantially similar to the radial value for Y, the middle key 2970*b* and the uphole key 2970*c* may be simultaneously located within second axial portion 2940 and the first axial portion 2930, respectively.

With reference to FIG. 29E, illustrated is the keyed running tool 2950 of FIG. 29D after continuing to push the keyed running tool 2950 downhole causing the middle key 2970*b* to also move to its radially retracted state (e.g., within the tubular 2910) and the uphole key 2970*c* to rotate to the angled portion 2935 of the slot 2920. Given the spacing between adjacent keys 2970, in one or more embodiments, if one key (e.g., the uphole key 2970*c*) is located within the angled portion 2935 of the slot 2920, adjacent key 2970 (e.g., the downhole key 2970*a* or the middle key 2970*b*) cannot also be located within the slot 2920.

Figure 29F:
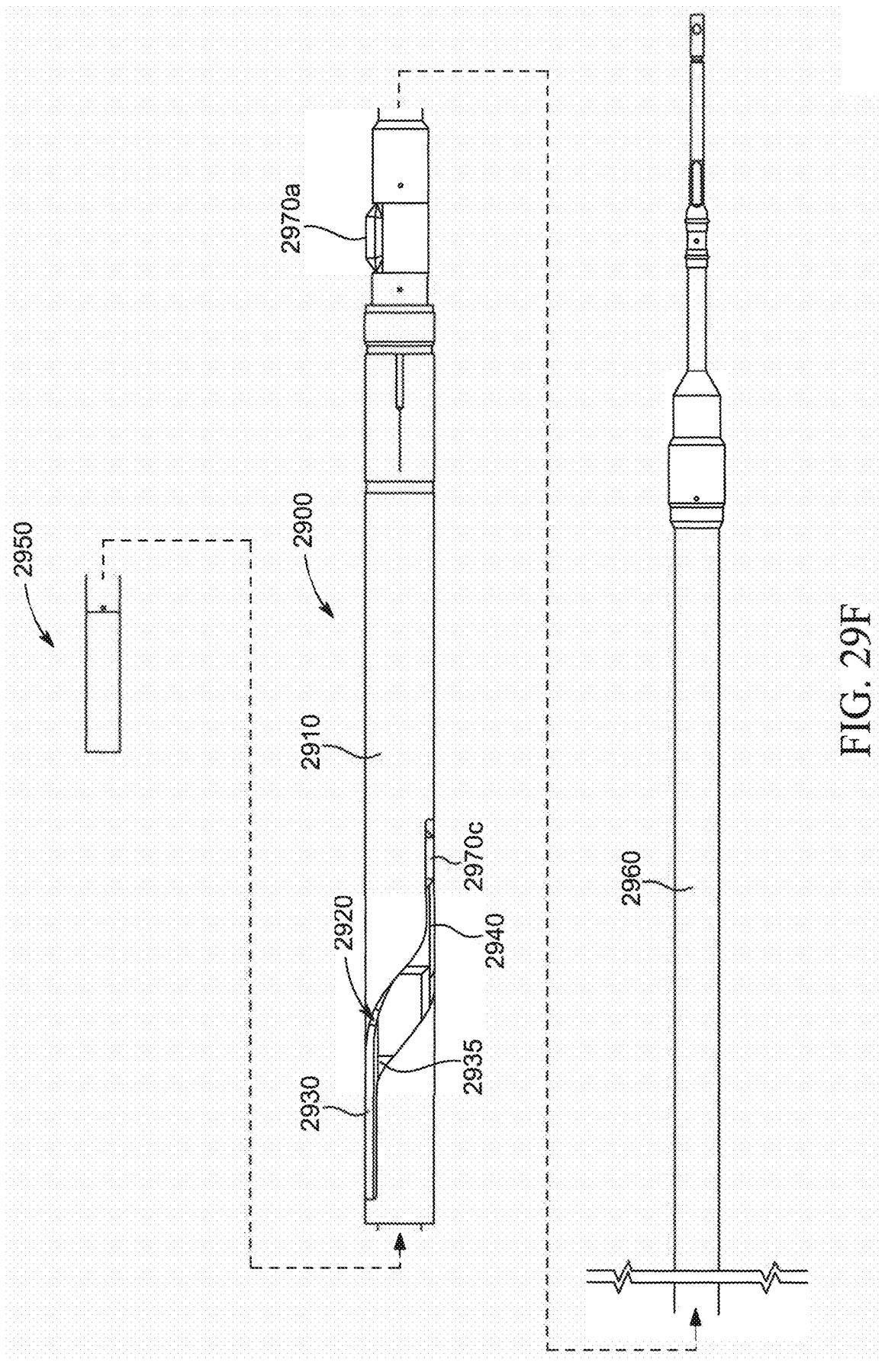

With reference to FIG. 29F, illustrated is the keyed running tool 2950 of FIG. 29E after continuing to push the keyed running tool 2950 downhole causing the uphole key 2970*c* to rotate within the slot 2920 until the uphole key 2970*c* is positioned within the second axial portion 2940 of the slot 2920. At this stage, at least in the embodiment of FIGS. 29A through 29F, the keyed running tool 2950 bottoms out, and thus cannot move any further downhole. Moreover, in certain embodiments, any downhole tool coupled to the keyed running tool 2950 is rotationally, and laterally, placed at a desired position within the wellbore.

The embodiment of FIGS. 29A through 29F assume that the downhole key 2970*a* is initially radially aligned with the slot 2920 such that as the keyed running tool 2950 is pushed downhole the downhole key 2970*a* would engage with at least one of the first axial portion 2930, the angled portion 2935, or the second axial portion 2940. Nevertheless, in certain instances the downhole key 2970*a* would be radially misaligned with the slot 2920 such that as the keyed running tool 2950 is pushed downhole the downhole key 2970*a* would not engage with the slot 2920. In such an instance, either one of the middle key 2970*b* or the uphole key 2970*c* might initially radially align with the slot 2920.

In the instance where the downhole key 2970*a* is radially misaligned with the slot 2920 but the middle key 2970*b* is at least partially radially aligned with the slot 2920, the keyed running tool 2950 would be pushed downhole causing the downhole key 2970*a* to miss the slot 2920 and the middle key 2970*b* to initially engage with and rotate within the slot 2920 until the middle key 2970*b* is positioned within the second axial portion 2940 of the slot 2920 and the uphole key 2970*c* is positioned within the first axial portion 2930 of the slot 2920, very similar to that shown in FIGS. 29C and 29D. Thereafter, the process would proceed by continuing to push the keyed running tool 2950 downhole causing the uphole key 2970*c* to rotate within the slot 2920 until the uphole key 2970*c* is positioned within the second axial portion 2940, at which time the downhole tool is rotationally positioned within the wellbore, similar to that shown in FIGS. 29E and 29F.

In the instance where the downhole key 2970*a* and the middle key 2970*b* are both radially misaligned with the slot 2920 but the uphole key 2970*c* is at least partially radially aligned with the slot 2920, the keyed running tool 2950 would be pushed downhole causing the downhole key 2970*a* and middle key 2970*b* to miss the slot 2920 and the uphole key 2970*c* to initially engage with and rotate within the slot 2920 until the uphole key 2970*c* is positioned within the second axial portion 2940, at which time the downhole tool is rotationally positioned within the wellbore, very similar to that shown in FIGS. 29E and 29F.

Unique to at least one embodiment of the design, no matter the radial alignment between the keyed running tool 2950 and the slotted orientation apparatus 2900, at least one of the downhole key 2970*a*, the middle key 2970*b*, or the uphole key 2970*c* will at least partially align with the slot 2920. Accordingly, regardless of the radial alignment, in at least one embodiment the uphole key 2970*c* will ultimately always end up in the second axial portion 2940, resulting in the downhole tool that is coupled to a downhole end of the keyed running tool 2950 being both laterally and rotationally positioned as a desired located within the wellbore.

It should be apparent to one skilled in the art that the keyed running tool 2950 may also align with respect to the slotted orientation apparatus 2900 when traveling from below the slotted orientation apparatus 2900 in an upward motion (e.g., provided the keys 2970*a*, 2970*b* and 2970*c* have the proper profile to engage the slot 2920 in the slotted orientation apparatus 2900. For example, the keys 2970*a*, 2970*b* and 2970*c* could engage with the slot 2920 in the opposite manner as was described above with respect to FIGS. 29A through 29F.

It should also be noted that the slotted orientation apparatus 2900 may have an upward no-go to hold the keyed running tool 2950 in an axial position until a desired amount of upward force is exerted to cause the no-go mechanism (not shown) to allow further upwardly movement. In some embodiments, one or more of the keys (e.g., uphole key 2970*c*) may provide the desired resistance to temporarily halt the upward movement of the keyed running tool 2950 (e.g., until additional force is applied).

It should also be noted that the slotted orientation apparatus 2900 may be designed to slide/fit inside a standard API-type casing, or a specially designed tubular with an OD similar (or different) than a standard API casing, tubing, or other tubular.

It should be noted that the lengths of the first and second axial portions 2930, 2940 do not have to be the same. In some examples it may be desirable for the keyed running tool 2950 to be held at a certain orientation by one or more of the keys 2970 until an additional distance has been traveled—or a certain event has occurred (e.g., mating up with another assembly pre-installed in the well). In one or more embodiments, the additional distance may be used to slow the rate of decent of 2950 by including one or more devices such as a dashpot, a spring, a cushion, a damper, or combination thereof to resist the motion of 2950 and the components attached to it. One or more components of such a device may be positioned between the distal end of 2900. In some embodiments, one or more devices may be used to releasably lock 2950 and/or associated components/assemblies (e.g., swivel, ETM, etc.) in place. In one or more embodiments, it may be beneficial to allow the 2950 and/or associated components (e.g., ETM, Fiber Optic Wet Mate, Production Tubing, etc.) to move after engagement. For instance, after an ETM (e.g., fiber optic Wet Mate, Electrical Wet Mate, a combination of ETMs) coupling is coupled together, the production string (e.g., tubing) may expand or contract due to changes in pressures (e.g., ballooning, etc.) or thermal changes (e.g., due to pumping a cold fluid down a warm/hot production tubing string, etc.) or for other reasons. In such cases, it would be pertinent to allow the ETM (and/or related parts) to move at least axially so that the loads generated by ballooning, heating/cooling, etc. will not load against the ETM couplings and try to force them apart. A device that allows the control line to expand/contract without generating forces on the ETM would be preferred. The device may comprise a coiled or folded control line which can allow (axial) movement without inducting high-stresses or loads on the control line and/or related components (such as the ETM). The space between the distal end of 2900 and the First Equipment (e.g., Lower Completion's Wet Mate, the Lower Completion's Sand Control String, etc.) would be a preferred location for devices mentioned above (e.g. mechanical device (such as a collet, spring, a dashpot, etc.), an electrical device (a sensor, switch, etc.), a fluidic device (reservoir, accumulator, a poppet valve, a check valve, etc.), an electronic device (a sensor, a MEMS device, etc.), etc. Other devices, technologies, etc. may also be employed in this area. In some or most cases the lower components of the third equipment section (aka Upper Completion String) may have complimentary features, devices, assemblies that may function together with the above-mentioned items (e.g., items located on the distal end of 2900). The above is not meant to limit the use of the area above 2900; similar or different features, devices, assemblies may be used above 2900 to aid in the efficient, reliable installation and use of the items disclosed within. The above items, features, devices, assemblies mentioned herein are applicable for use with a second equipment section (e.g., Work String) or other Equipment Sections such as another Equipment Section similar to the second equipment section (e.g., Work String) which may be used before Third Equipment String is used and/or after Third Equipment String is used.

It should be apparent that the slotted orientation apparatus (e.g., slotted orientation apparatus 2600, 2900) and the keyed running tool (e.g., keyed running tool 2800, 2950) disclosed herein may be used to perform other actions whether or not debris may be an issue. For example, the slotted orientation apparatus may be used to orient tools for formation evaluation, production evaluation, evaluating the condition of tools/equipment, etc. In at least one embodiment, the slotted orientation apparatus could orient a feeler gauge (e.g., multi-finger device) to measure erosion at various orientations.

A keyed running tool according to the disclosure may be a sleeve-type device, wherein after it orients a tool it remains located in the slotted orientation apparatus while the oriented tool (and coiled tubing) continues to move downward. For example, the sleeve-type keyed running tool might orient the tool so it enters the mainbore leg of a multilateral junction. After the oriented tool is aligned, the sleeve-type keyed running tool might release itself from the tubing (e.g., coiled tubing), so the oriented tool can continue to be lowered into the mainbore via the tubing. In at least one other embodiment, the sleeve-type keyed running tool could have a jay-profile, so that when the other tool is pulled back above a y-block, the sleeve-type keyed running will index 90-degrees and the other tool will enter the lateral bore of the multilateral junction and/or y-block.

Turning to FIG. 25', as well as FIGS. 29A' through 29F', illustrated is a hydraulic stimulation device designed, manufactured and/or operated according to one or more embodiments of the disclosure. The hydraulic stimulation device is similar in many respects to the multilateral junction 2500 and slotted orienting apparatus 2900 disclosed above, and thus may share many of the same features.

Aspects disclosed herein include:

A. A well system, the well system including: 1) a wellbore extending through one or more subterranean formations; 2) a tubular located within the wellbore; and 3) an energy transfer mechanism coupled to the tubular, wherein the energy transfer mechanism is located above 3 o'clock or above 9 o'clock relative to gravity.

B. A method, the method including: 1) forming a wellbore through one or more subterranean formations; 2) positioning a tubular within the wellbore, the tubular having an energy transfer mechanism coupled thereto; and 3) rotating the energy transfer mechanism such that the energy transfer mechanism is located above 3 o'clock or above 9 o'clock relative to gravity.

Aspects A and B may have one or more of the following additional elements in combination: Element 1: wherein the energy transfer mechanism has a first coupling surface configured to couple with an opposing second coupling surface of a second energy transfer mechanism, and further wherein the first coupling surface is located above 3 o'clock or above 9 o'clock relative to gravity. Element 2: wherein all portions of the energy transfer mechanism are located above 3 o'clock or above 9 o'clock relative to gravity. Element 3: wherein the energy transfer mechanism is a wet mate energy transfer mechanism. Element 4: wherein the tubular and the wet mate energy transfer mechanism are a first tubular and a first wet mate energy transfer mechanism associated with a lower completion string. Element 5: further including a second tubular and a second wet mate energy transfer mechanism positioned within the wellbore proximate the first wet mate energy transfer mechanism. Element 6: wherein the second tubular engages with the first tubular and the second wet mate energy transfer mechanism couples with the first wet mate energy transfer mechanism. Element 7: wherein the second tubular and second wet mate energy transfer mechanism are associated with a work string. Element 8: wherein the second tubular and second wet mate energy transfer mechanism are associated with an upper completion string. Element 9: wherein the energy transfer mechanism is located above 1 o'clock or above 11 o'clock relative to gravity. Element 10: wherein the energy transfer mechanism has a first coupling surface configured to couple with an opposing second coupling surface of a second energy transfer mechanism, and further wherein rotating includes rotating the energy transfer mechanism such that the first coupling surface is located above 3 o'clock or above 9 o'clock relative to gravity. Element 11: wherein rotating includes rotating the energy transfer mechanism such that all portions of the energy transfer mechanism are located above 3 o'clock or above 9 o'clock relative to gravity. Element 12: wherein the energy transfer mechanism is a wet mate energy transfer mechanism. Element 13: wherein the tubular and the wet mate energy transfer mechanism are a first tubular and a first wet mate energy transfer mechanism associated with a lower completion string. Element 14: further including a second tubular and a second wet mate energy transfer mechanism positioned within the wellbore proximate the first wet mate energy transfer mechanism. Element 15: wherein the second tubular engages with the first tubular and the second wet mate energy transfer mechanism couples with the first wet mate energy transfer mechanism. Element 16: wherein the second tubular and second wet mate energy transfer mechanism are associated with a work string. Element 17: wherein the second tubular and second wet mate energy transfer mechanism are associated with an upper completion string. Element 18: further including using a downhole orientation tool to rotate the energy transfer mechanism such that the energy transfer mechanism is located above 3 o'clock or above 9 o'clock relative to gravity.

Those skilled in the art to which this application relates will appreciate that other and further additions, deletions, substitutions and modifications may be made to the described embodiments.

What is claimed is:

1. A well system, comprising:
a wellbore extending through one or more subterranean formations;
a tubular located within the wellbore; and
an energy transfer mechanism coupled to the tubular, wherein the energy transfer mechanism is located between +10 degrees and +90 degrees or between −10 degrees and −90 degrees relative to gravity.

2. The well system as recited in claim 1, wherein the energy transfer mechanism has a first coupling surface configured to couple with an opposing second coupling surface of a second energy transfer mechanism, and further wherein the first coupling surface is located between +10 degrees and +90 degrees or between −10 degrees and −90 degrees relative to gravity.

3. The well system as recited in claim 2, wherein all portions of the energy transfer mechanism are located between +10 degrees and +90 degrees or between −10 degrees and −90 degrees relative to gravity.

4. The well system as recited in claim 1, wherein the energy transfer mechanism is a wet mate energy transfer mechanism.

5. The well system as recited in claim 4, wherein the tubular and the wet mate energy transfer mechanism are a first tubular and a first wet mate energy transfer mechanism associated with a lower completion string.

6. The well system as recited in claim 5, further including a second tubular and a second wet mate energy transfer mechanism positioned within the wellbore proximate the first wet mate energy transfer mechanism.

7. The well system as recited in claim 6, wherein the second tubular engages with the first tubular and the second wet mate energy transfer mechanism couples with the first wet mate energy transfer mechanism.

8. The well system as recited in claim 6, wherein the second tubular and second wet mate energy transfer mechanism are associated with a work string.

9. The well system as recited in claim 6, wherein the second tubular and second wet mate energy transfer mechanism are associated with an upper completion string.

10. The well system as recited in claim 1, wherein the energy transfer mechanism is located between +10 degrees and +30 degrees or between −10 degrees and −30 degrees relative to gravity.

11. A method, comprising:
forming a wellbore through one or more subterranean formations;
positioning a tubular within the wellbore, the tubular having an energy transfer mechanism coupled thereto; and
rotating the energy transfer mechanism such that the energy transfer mechanism is located between +10 degrees and +90 degrees or between −10 degrees and −90 degrees relative to gravity.

12. The method as recited in claim 11, wherein the energy transfer mechanism has a first coupling surface configured to couple with an opposing second coupling surface of a second energy transfer mechanism, and further wherein rotating includes rotating the energy transfer mechanism such that the first coupling surface is located between +10 degrees and +90 degrees or between −10 degrees and −90 degrees relative to gravity.

13. The method as recited in claim 12, wherein rotating includes rotating the energy transfer mechanism such that all portions of the energy transfer mechanism are located between +10 degrees and +90 degrees or between −10 degrees and −90 degrees relative to gravity.

14. The method as recited in claim 11, wherein the energy transfer mechanism is a wet mate energy transfer mechanism.

15. The method as recited in claim 11, wherein the tubular and the wet mate energy transfer mechanism are a first tubular and a first wet mate energy transfer mechanism associated with a lower completion string.

16. The method as recited in claim 15, further including a second tubular and a second wet mate energy transfer mechanism positioned within the wellbore proximate the first wet mate energy transfer mechanism.

17. The method as recited in claim 16, wherein the second tubular engages with the first tubular and the second wet mate energy transfer mechanism couples with the first wet mate energy transfer mechanism.

18. The method as recited in claim 16, wherein the second tubular and second wet mate energy transfer mechanism are associated with a work string.

19. The method as recited in claim 16, wherein the second tubular and second wet mate energy transfer mechanism are associated with an upper completion string.

20. The method as recited in claim 11, further including using a downhole orientation tool to rotate the energy transfer mechanism such that the energy transfer mechanism is located between +10 degrees and +90 degrees or between −10 degrees and −90 degrees relative to gravity.

* * * * *